(12) United States Patent
Bae et al.

(10) Patent No.: US 10,402,592 B2
(45) Date of Patent: Sep. 3, 2019

(54) ELECTRONIC DEVICE AND METHOD FOR OPERATING THE SAME

(71) Applicant: LG ELECTRONICS INC., Seoul (KR)

(72) Inventors: Kyungnam Bae, Seoul (KR); Eunjung Lee, Seoul (KR); Mingi Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 238 days.

(21) Appl. No.: 15/508,656

(22) PCT Filed: Jun. 18, 2015

(86) PCT No.: PCT/KR2015/006169
§ 371 (c)(1),
(2) Date: Mar. 3, 2017

(87) PCT Pub. No.: WO2016/035984
PCT Pub. Date: Mar. 10, 2016

(65) Prior Publication Data
US 2017/0277902 A1   Sep. 28, 2017

(30) Foreign Application Priority Data
Sep. 5, 2014   (KR) .................. 10-2014-0119249

(51) Int. Cl.
*G06F 21/00* (2013.01)
*H04L 29/06* (2006.01)
(Continued)

(52) U.S. Cl.
CPC .......... *G06F 21/629* (2013.01); *G06F 3/1454* (2013.01); *G06Q 50/01* (2013.01);
(Continued)

(58) Field of Classification Search
CPC ................. G06F 21/629; G06F 3/1454; G06F 2221/032; G06Q 50/01; G09G 2340/0492
See application file for complete search history.

(56) References Cited

U.S. PATENT DOCUMENTS

2010/0020086 A1\* 1/2010 Suzuki ..................... G06F 3/14
345/502
2010/0214193 A1\* 8/2010 Kubota ................... G06F 3/038
345/2.2

(Continued)

OTHER PUBLICATIONS

International Search Report and Written Opinion dated Oct. 12, 2015 issued in Application No. PCT/KR2015/006169 (Full English Text).

*Primary Examiner* — Lisa C Lewis
(74) *Attorney, Agent, or Firm* — KED & Associates LLP

(57) ABSTRACT

A method for operating an electronic device according to an embodiment of the present invention includes: entering a content sharing mode capable of sharing content with a first electronic device; outputting first content shared with the first electronic device; entering a content sharing mode capable of sharing content with a second electronic device; determining the authority to decide a display layout, with respect to the second electronic device; transmitting display layout information to the second electronic device upon determining that the second electronic device has the authority to decide the display layout; and receiving, from the second electronic device, display layout determination information including information on output positions of content shared with the first and second electronic devices. Accordingly, it is possible to provide various optimized display layouts of a screen displaying content of connected electronic devices.

20 Claims, 24 Drawing Sheets

(51) Int. Cl.
*G06F 21/62* (2013.01)
*G06F 3/14* (2006.01)
*G06Q 50/00* (2012.01)

(52) U.S. Cl.
CPC ............. *G06F 2221/032* (2013.01); *G09G 2340/0492* (2013.01)

(56) References Cited

U.S. PATENT DOCUMENTS

| | | | | |
|---|---|---|---|---|
| 2011/0283185 | A1* | 11/2011 | Obasanjo | G06F 17/3089 715/243 |
| 2013/0145457 | A1* | 6/2013 | Papakipos | G06F 21/6245 726/19 |
| 2013/0155173 | A1* | 6/2013 | Brady | H04N 7/15 348/14.03 |
| 2013/0159884 | A1* | 6/2013 | Isozu | H04W 4/023 715/753 |
| 2013/0326397 | A1* | 12/2013 | Kim | G06F 3/0484 715/781 |

* cited by examiner

[Fig. 1]
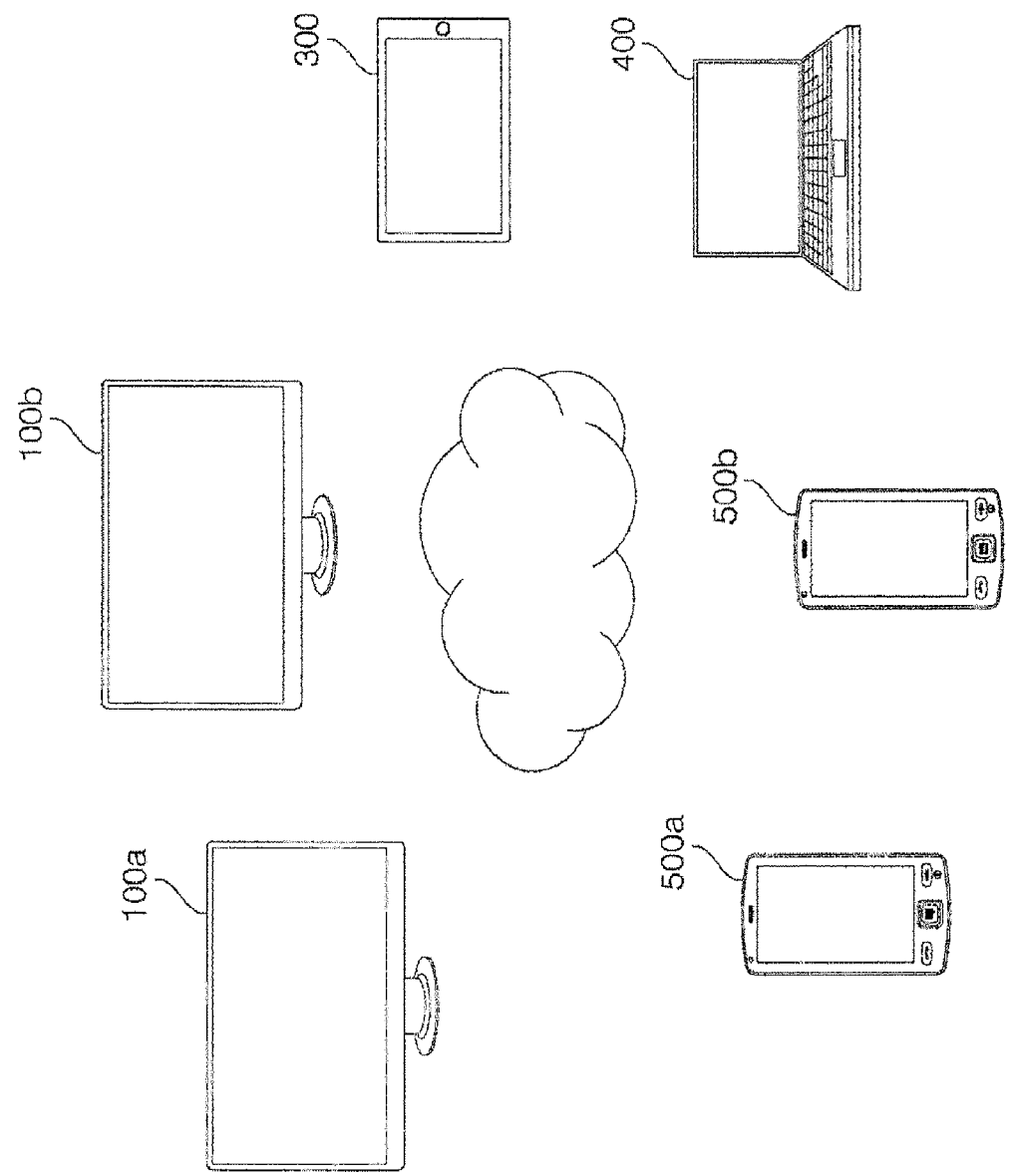

[Fig. 2]
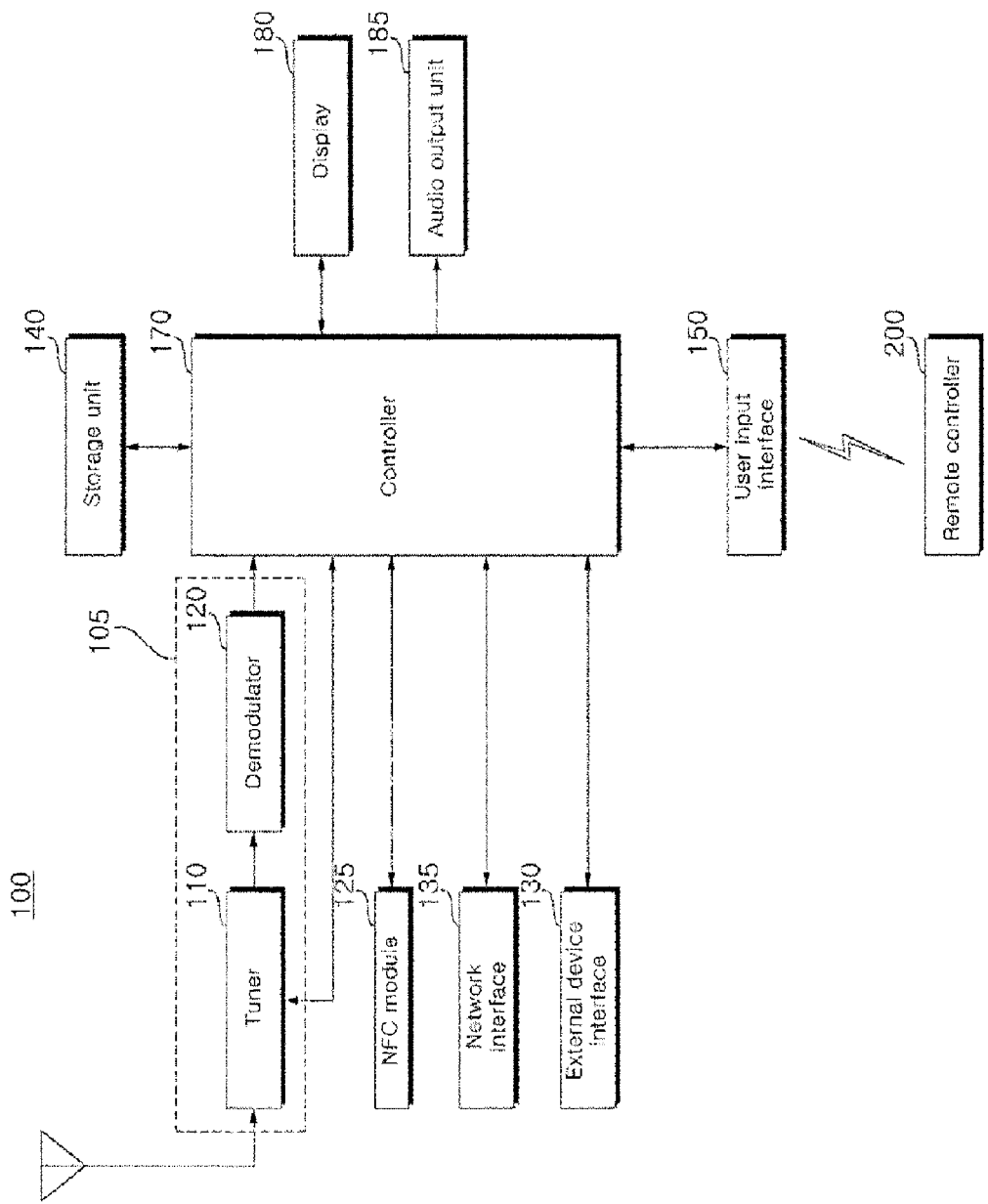

[Fig. 3]
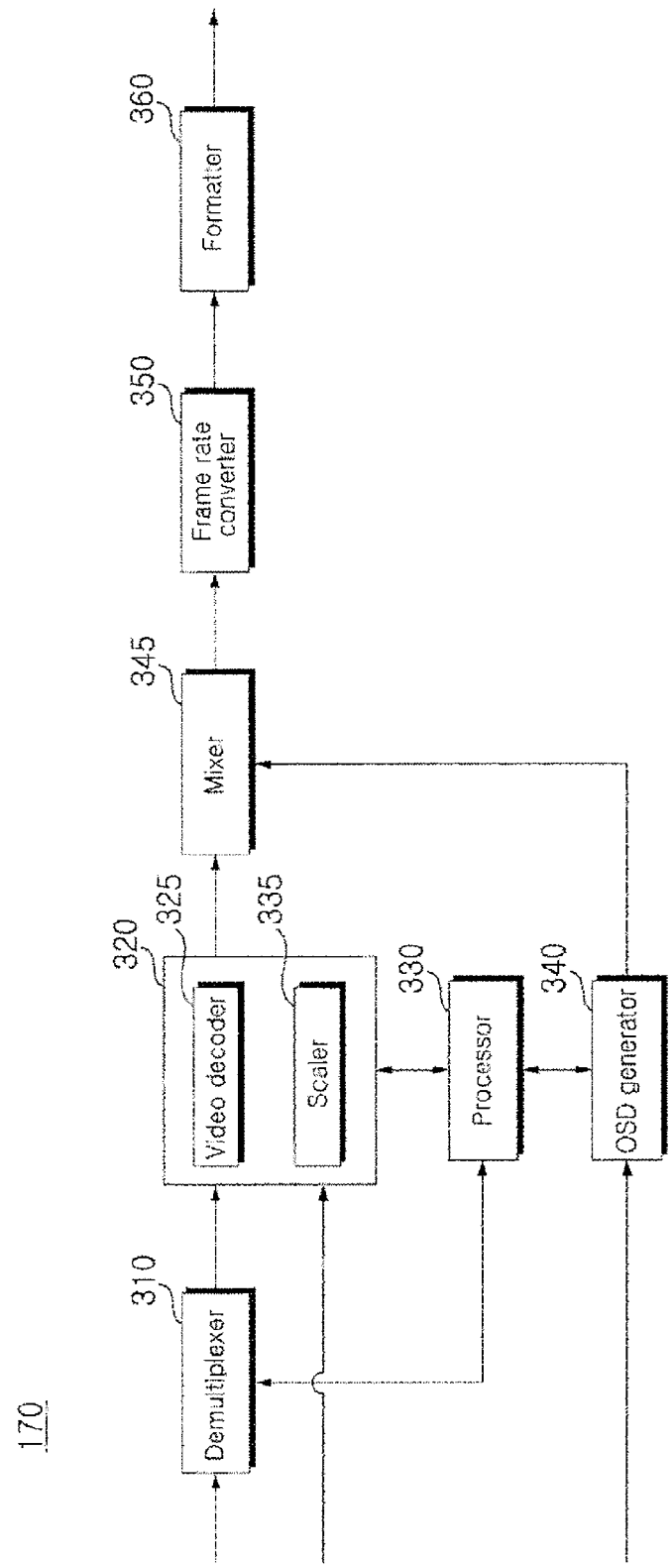

[Fig. 4]
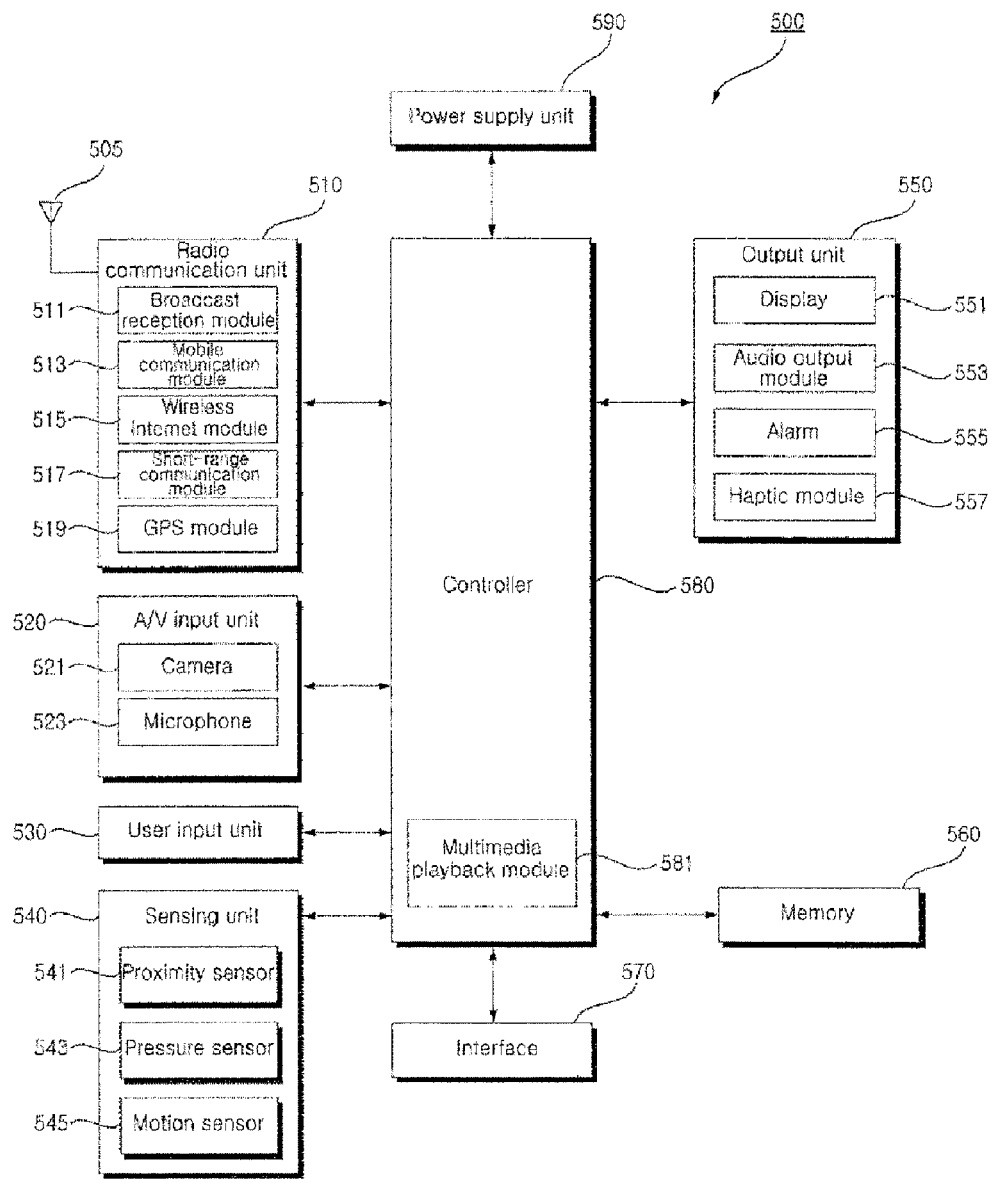

[Fig. 5]
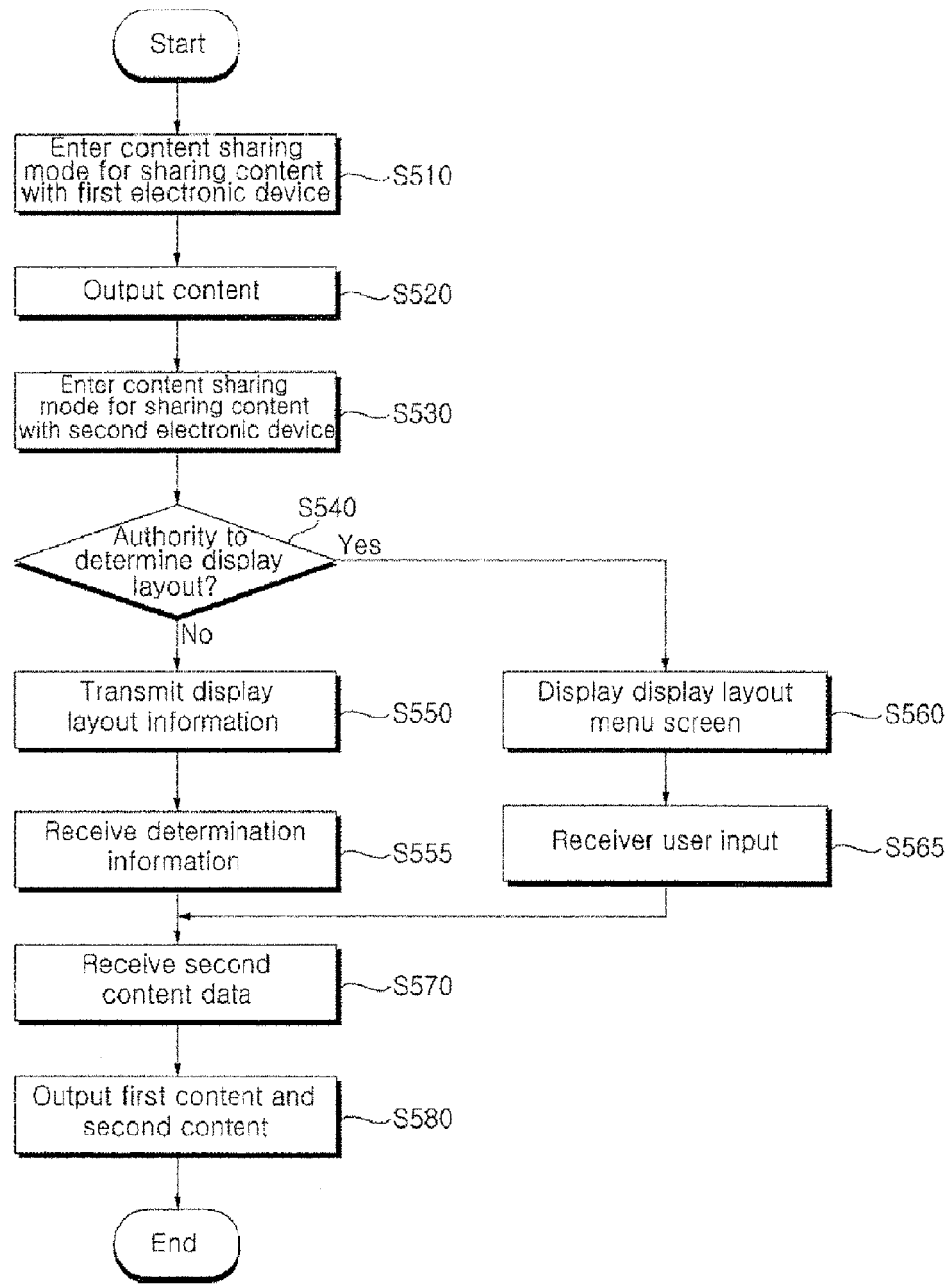

[Fig. 6]
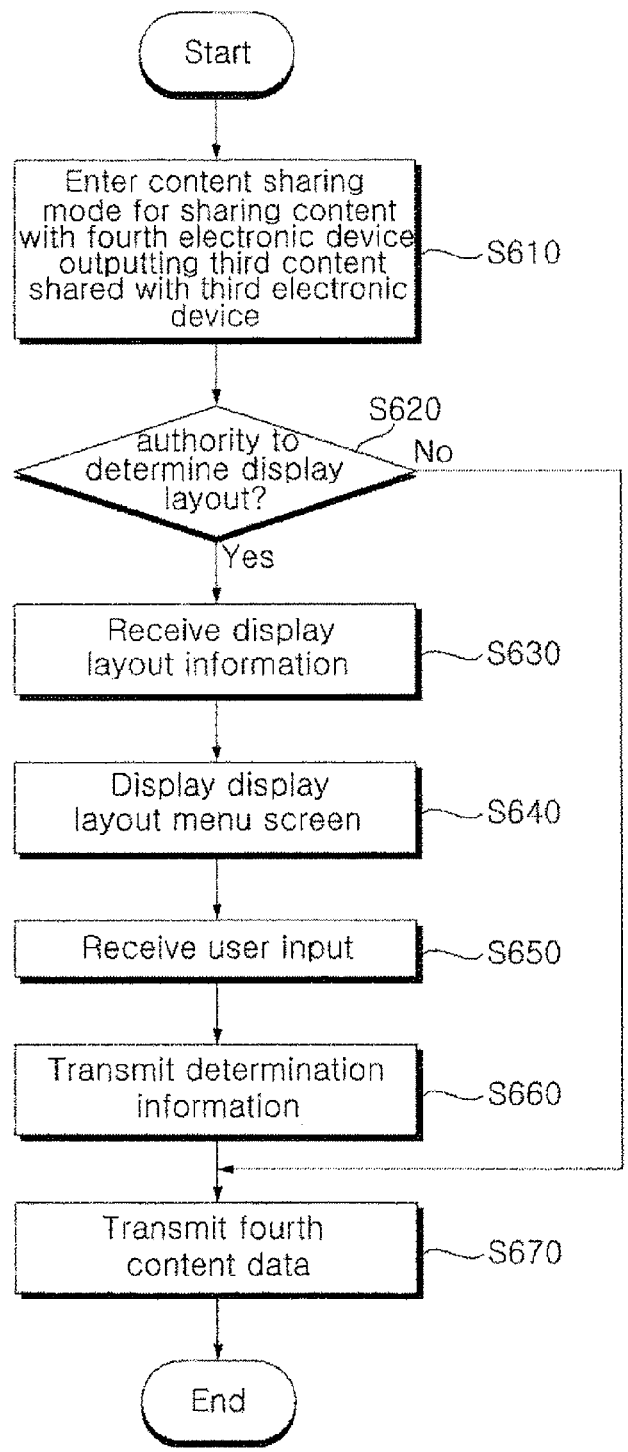

[Fig. 7]
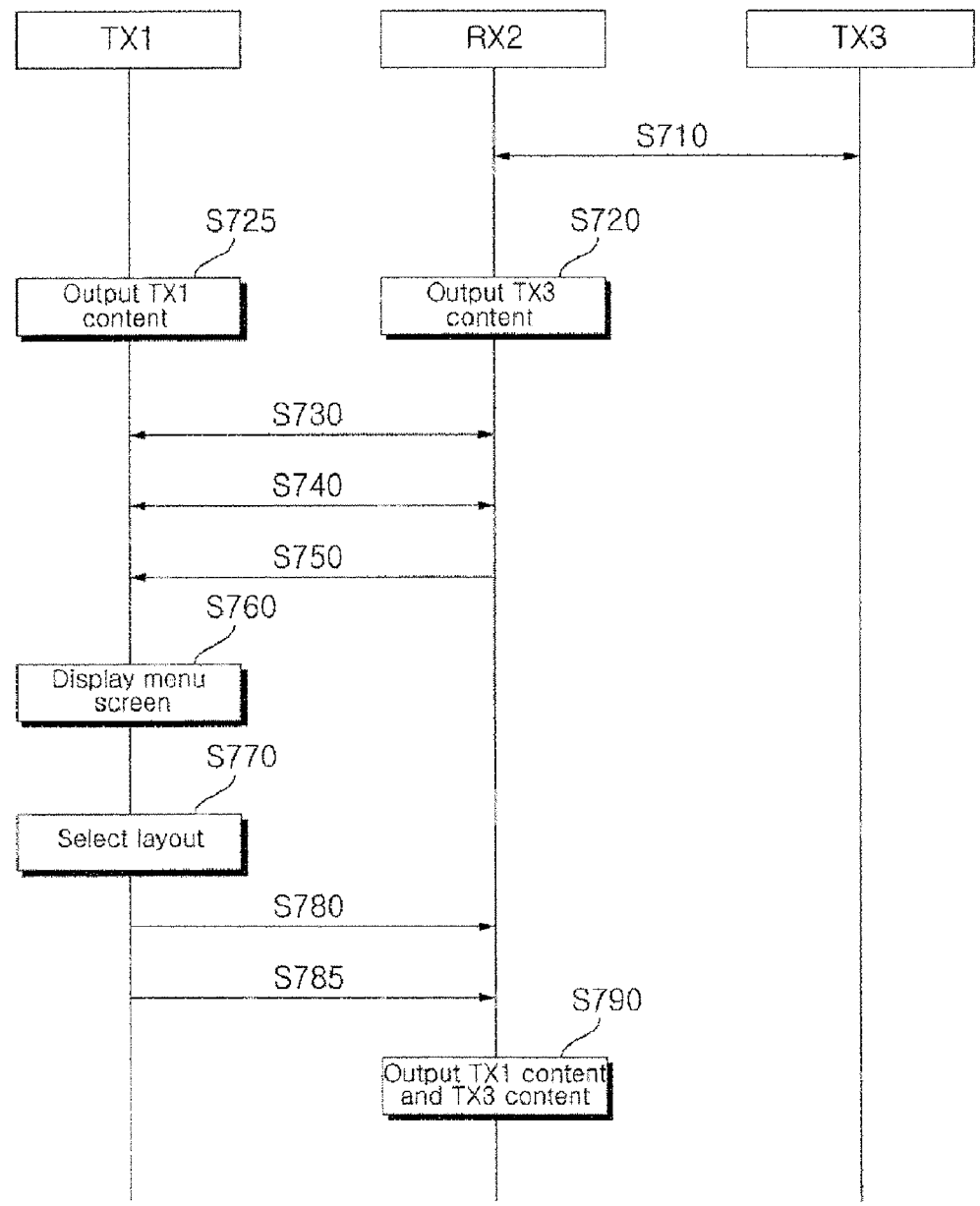

[Fig. 8]

[Fig. 9]
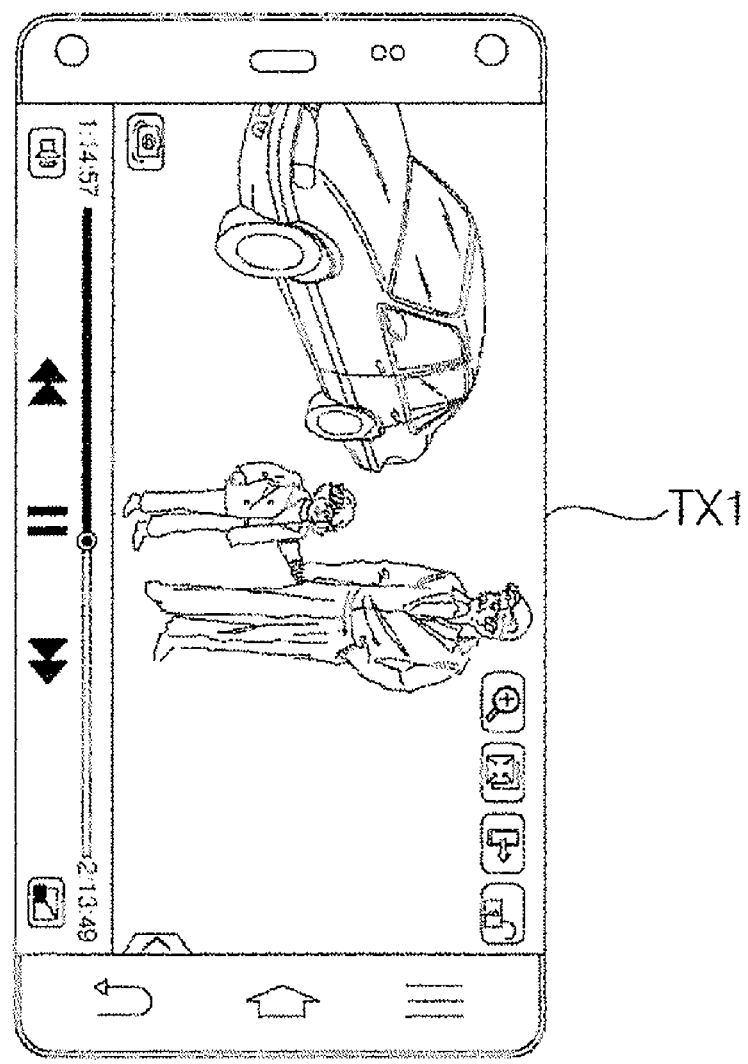

[Fig. 10a]
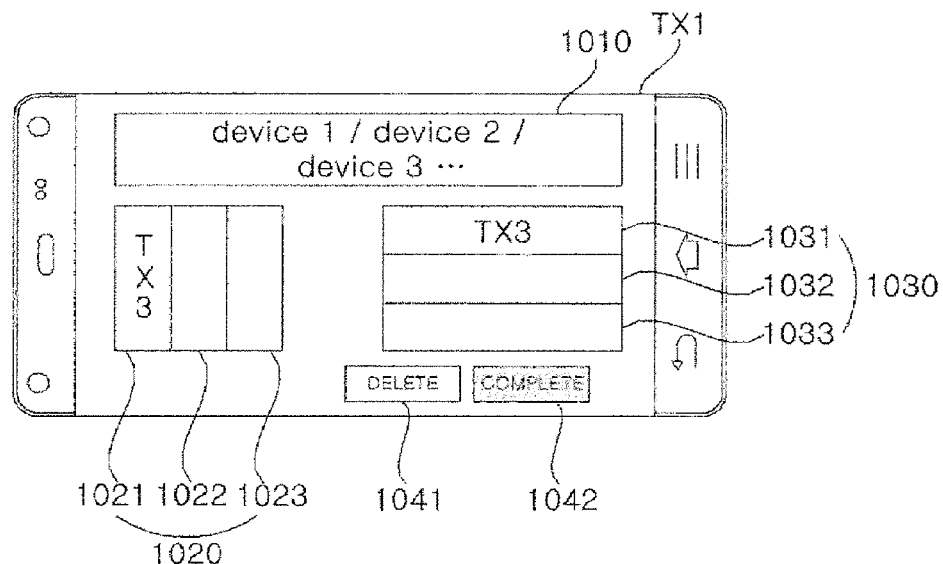
[Fig. 10b]
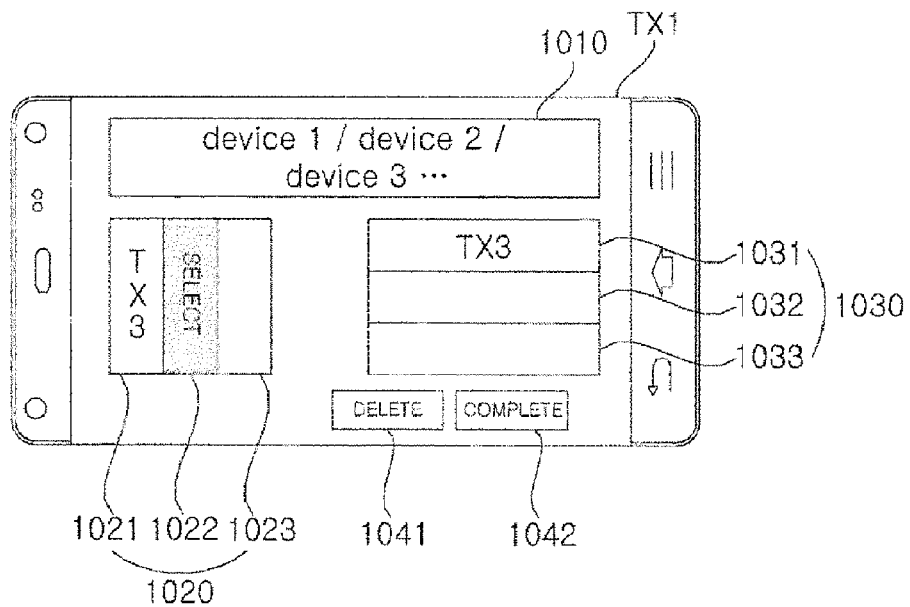

[Fig. 10c]
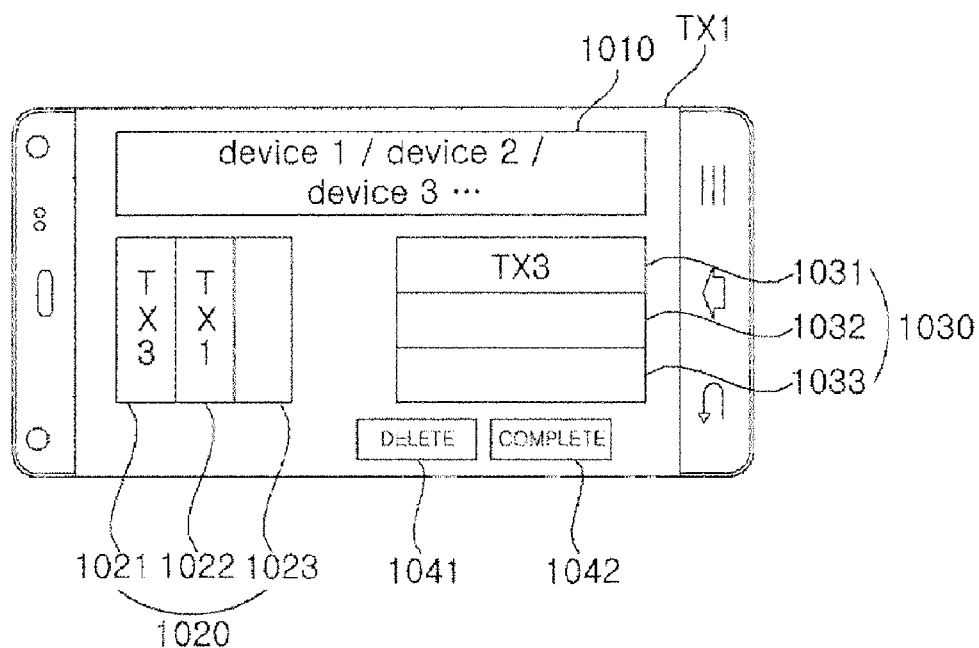
[Fig. 10d]
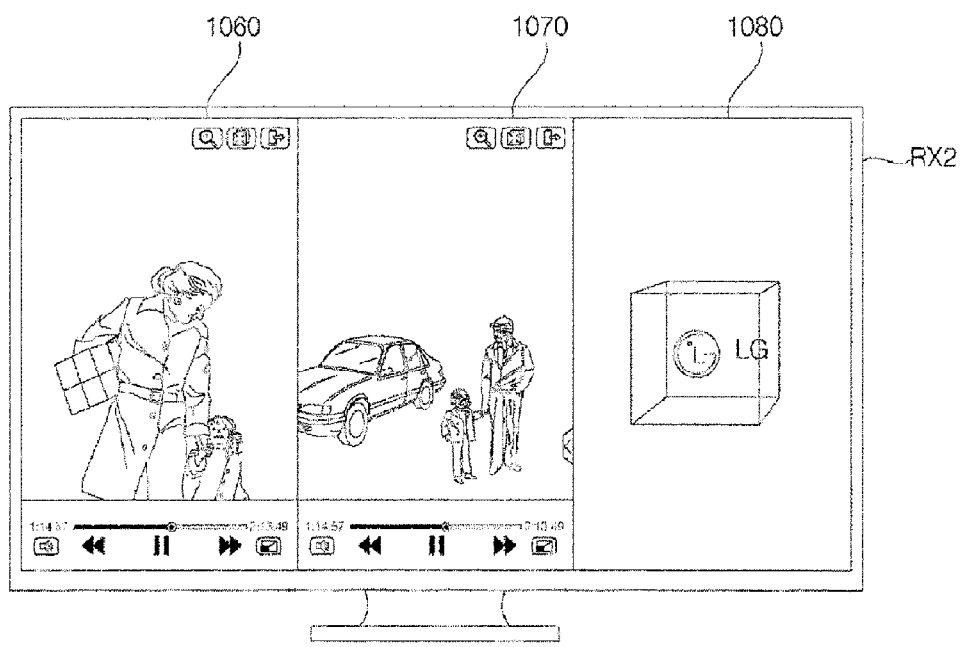

[Fig. 11a]
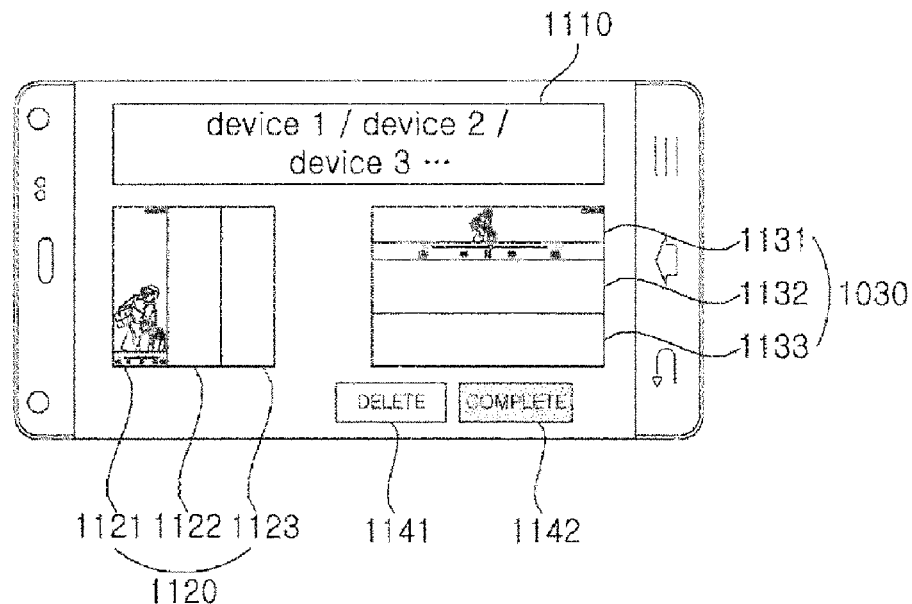
[Fig. 11b]
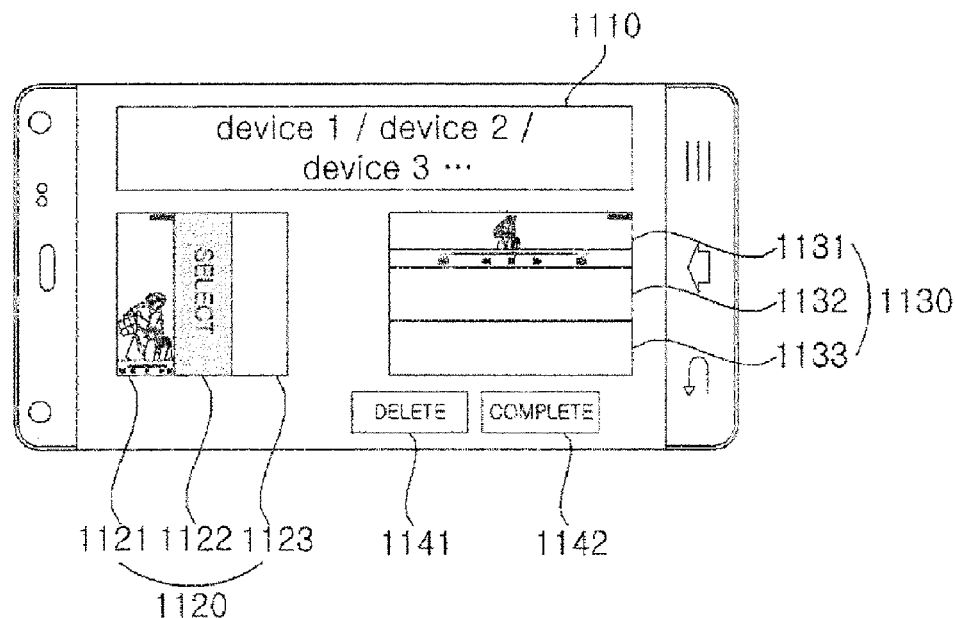

[Fig. 11c]
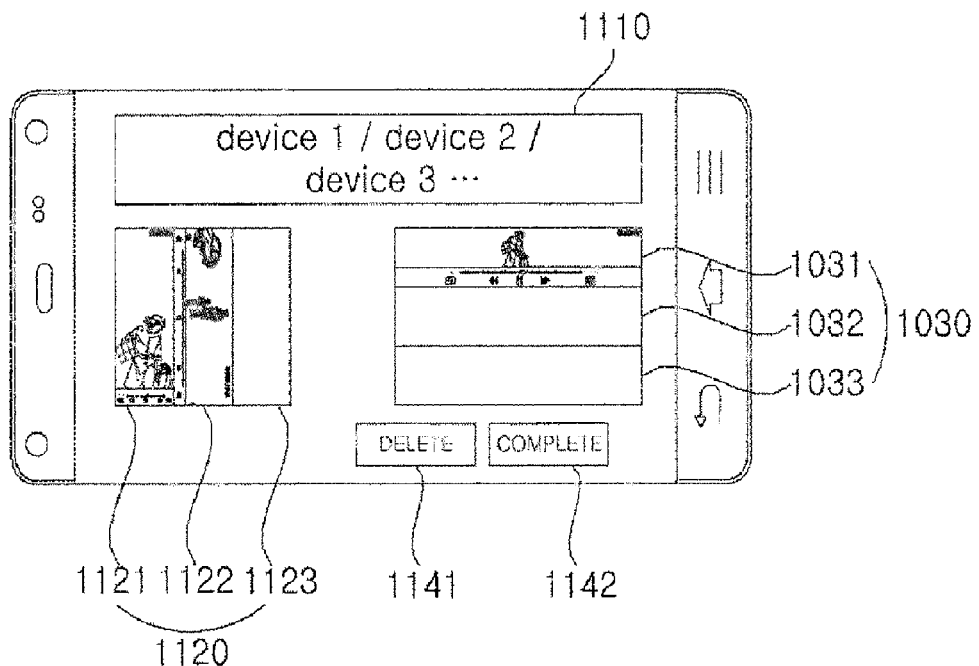
[Fig. 11d]
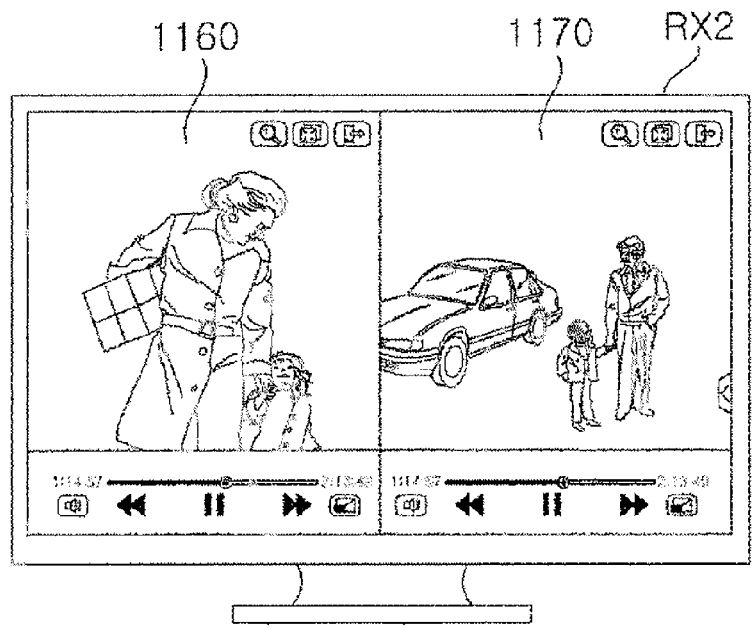

[Fig. 12]
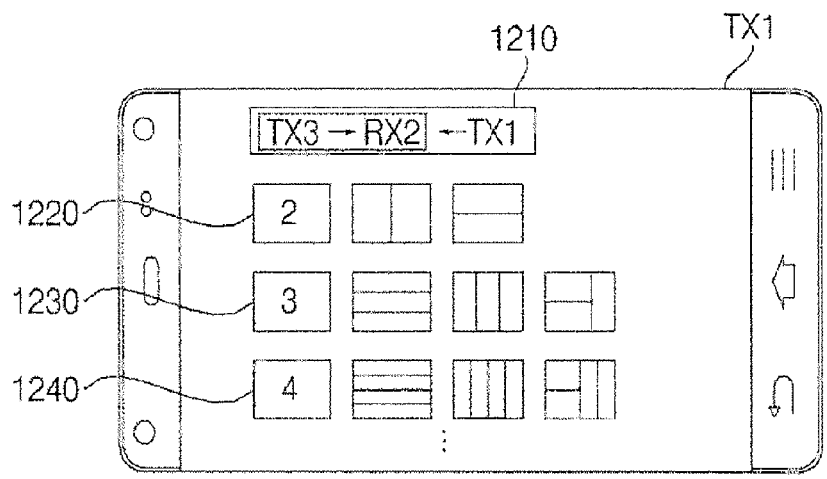
[Fig. 13a]
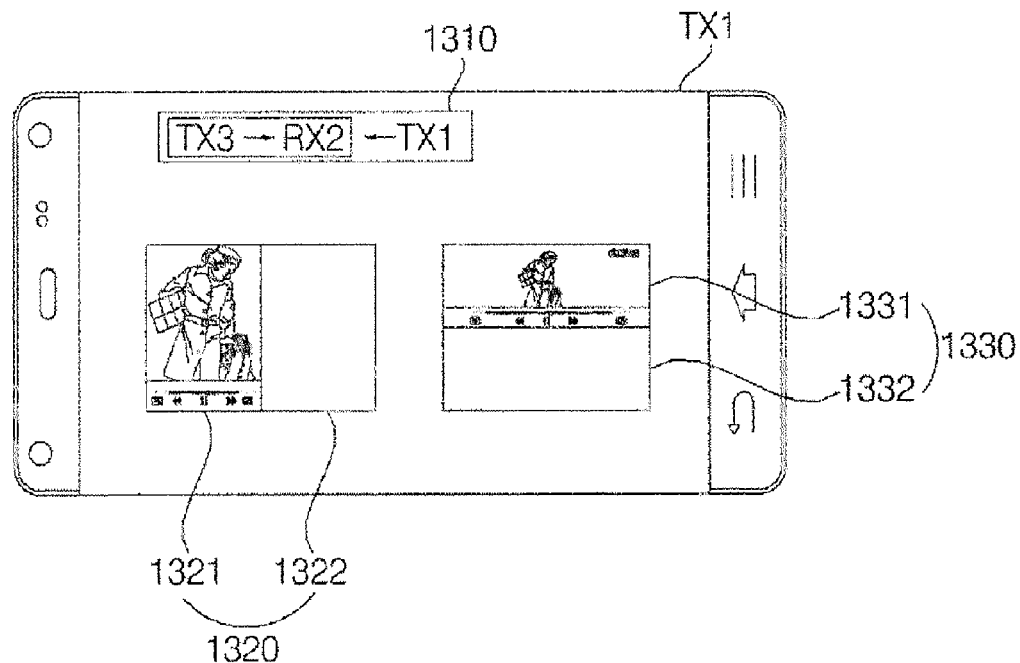

[Fig. 13b]
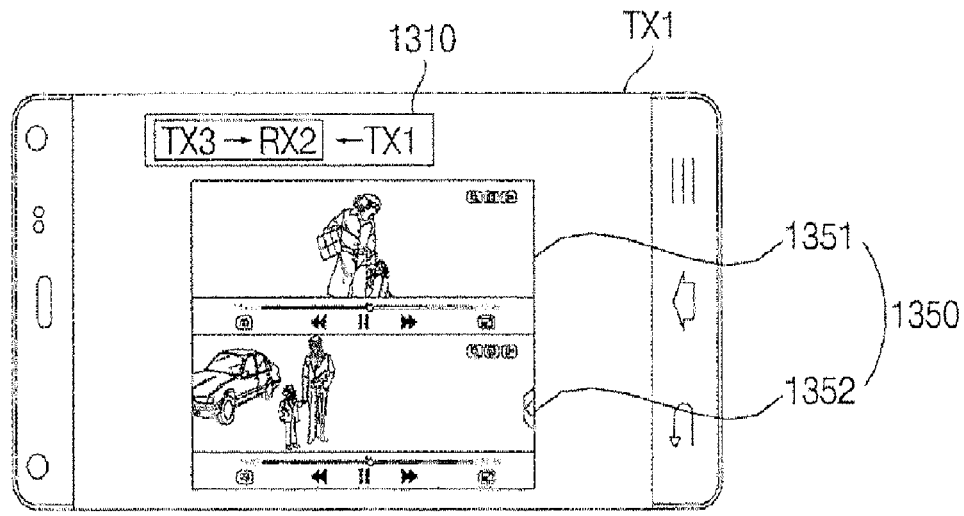
[Fig. 14a]
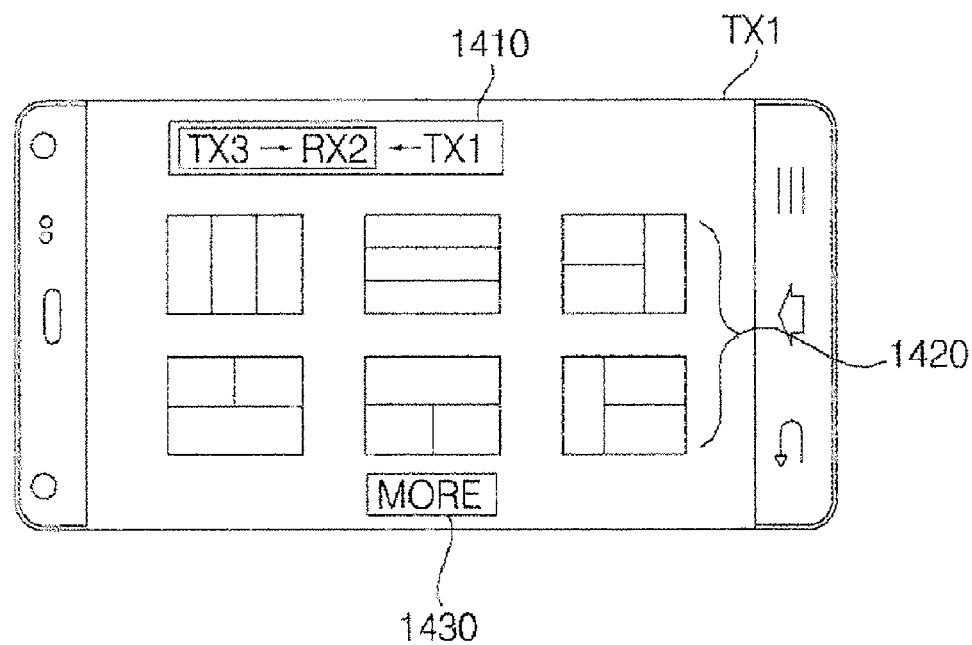

[Fig. 14b]
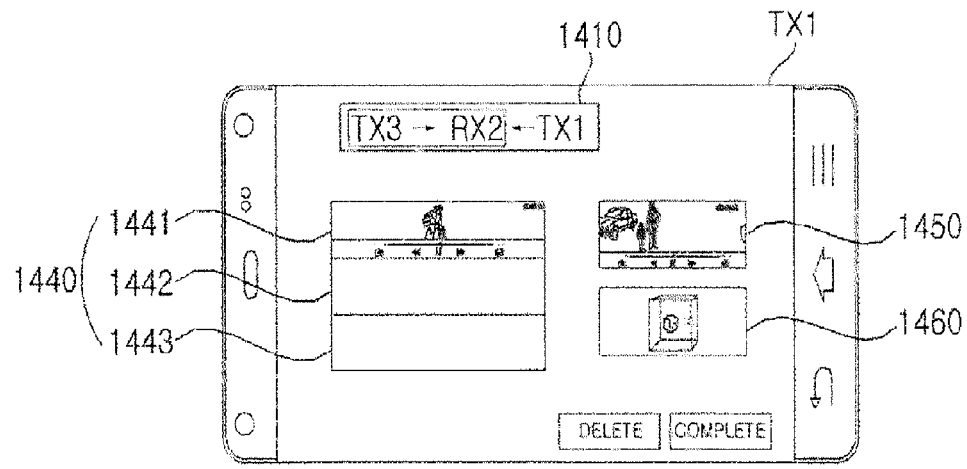
[Fig. 14c]
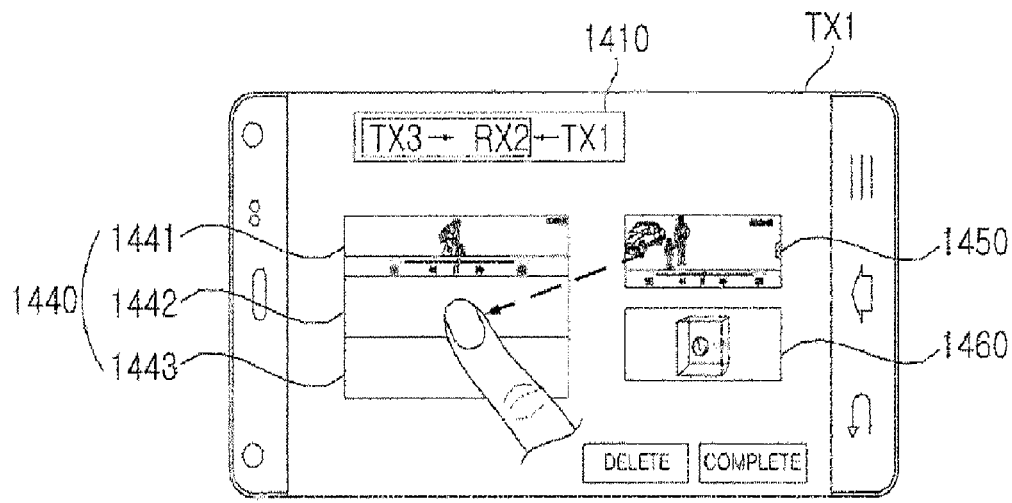

[Fig. 14d]
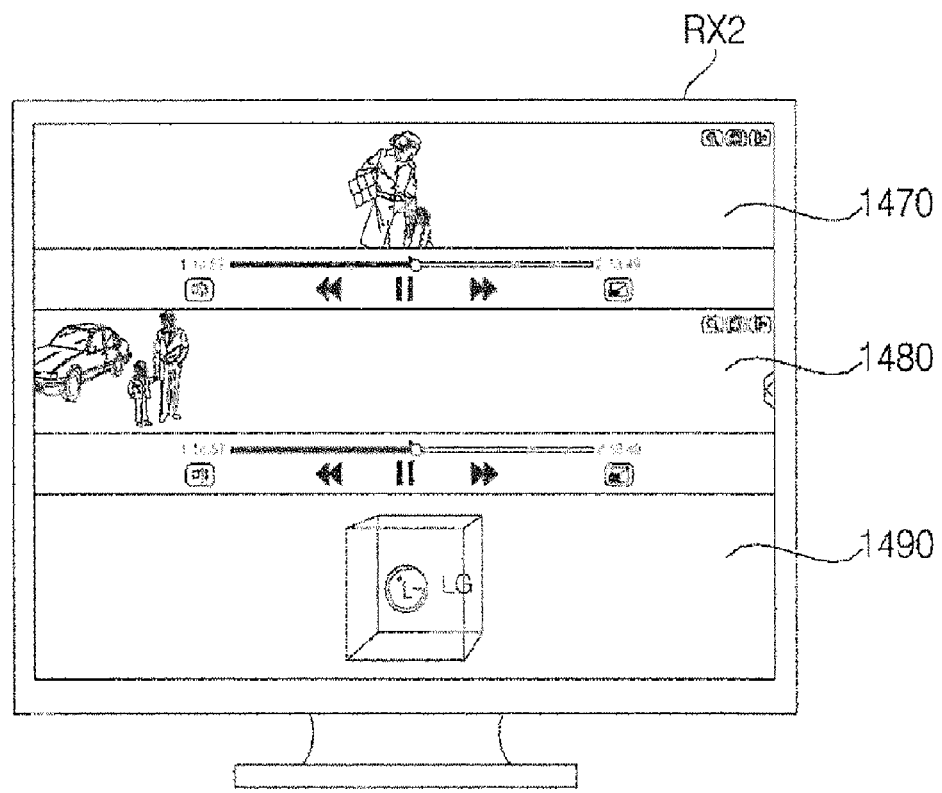

[Fig. 15]
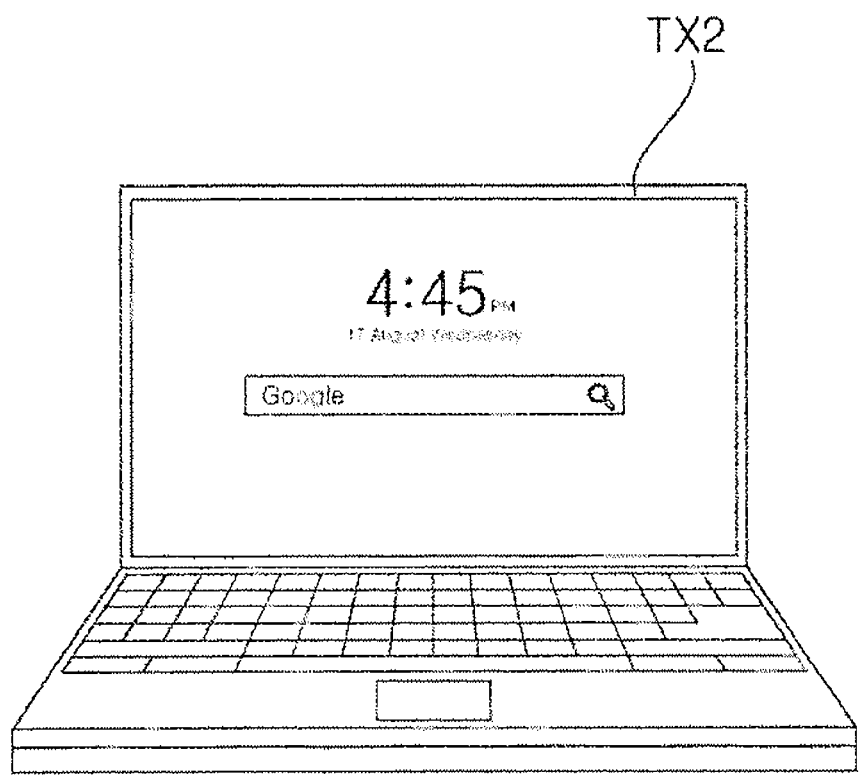

[Fig. 16]
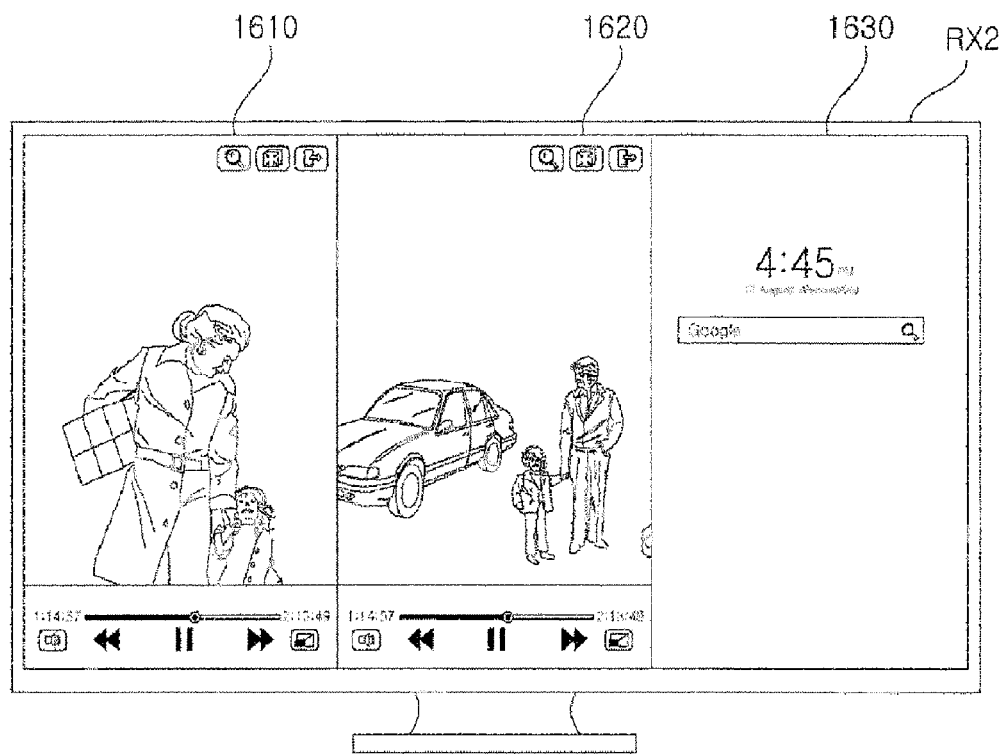

[Fig. 17]
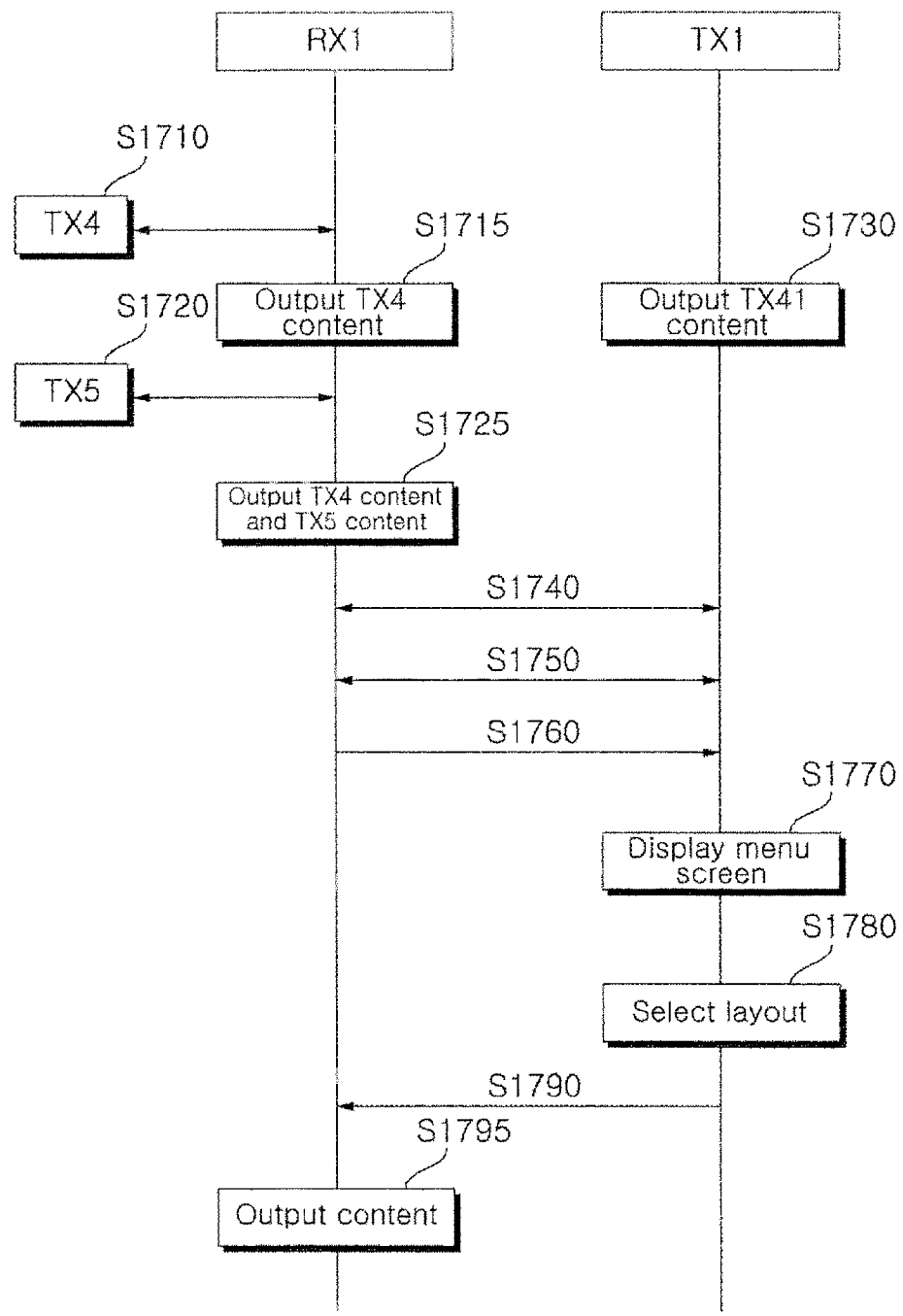

[Fig. 18]
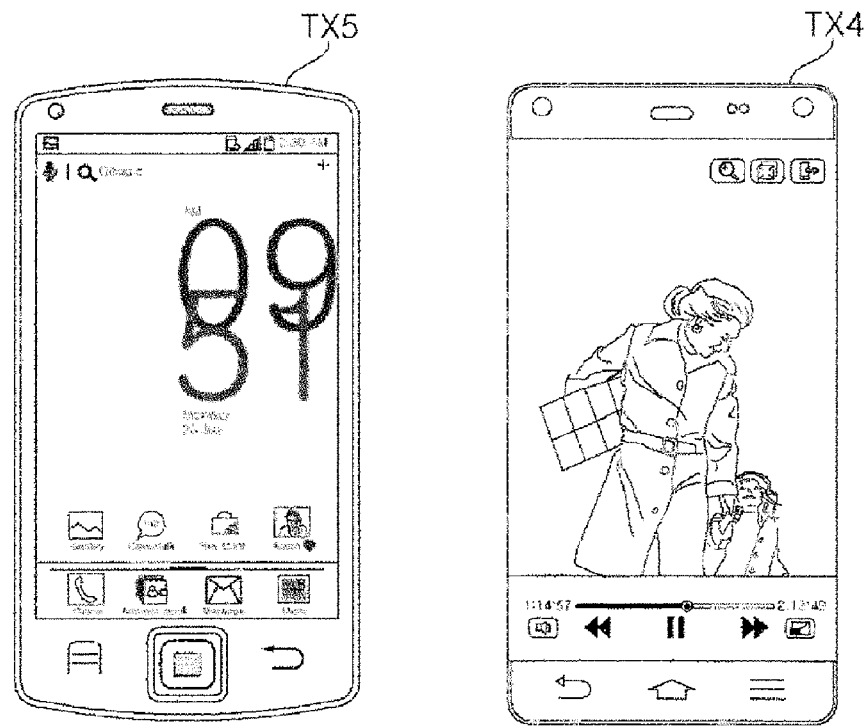
[Fig. 19]
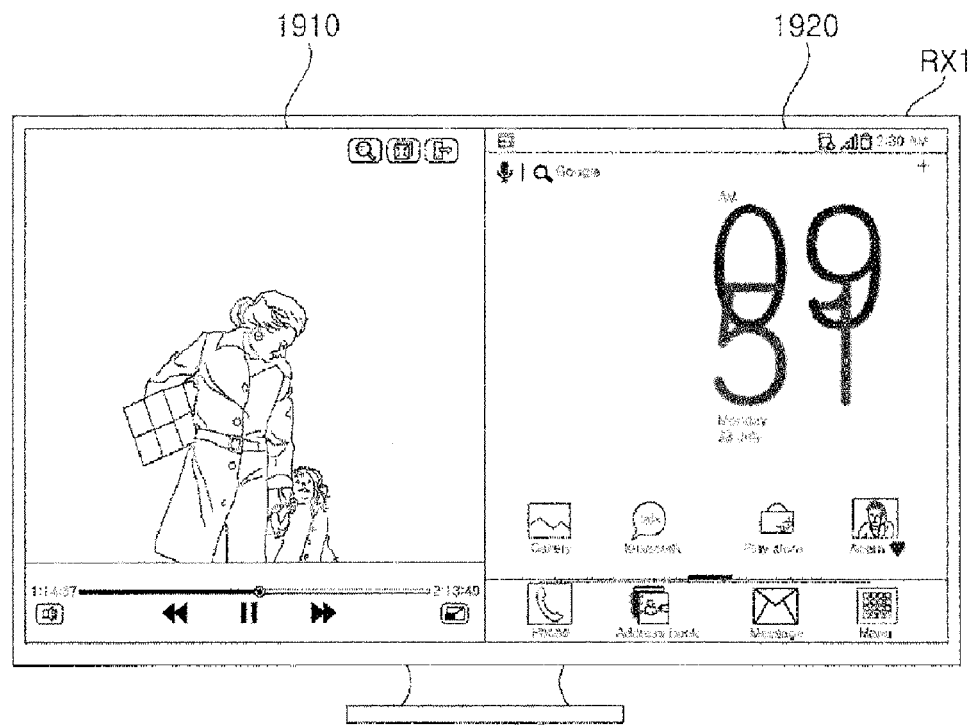

[Fig. 20]
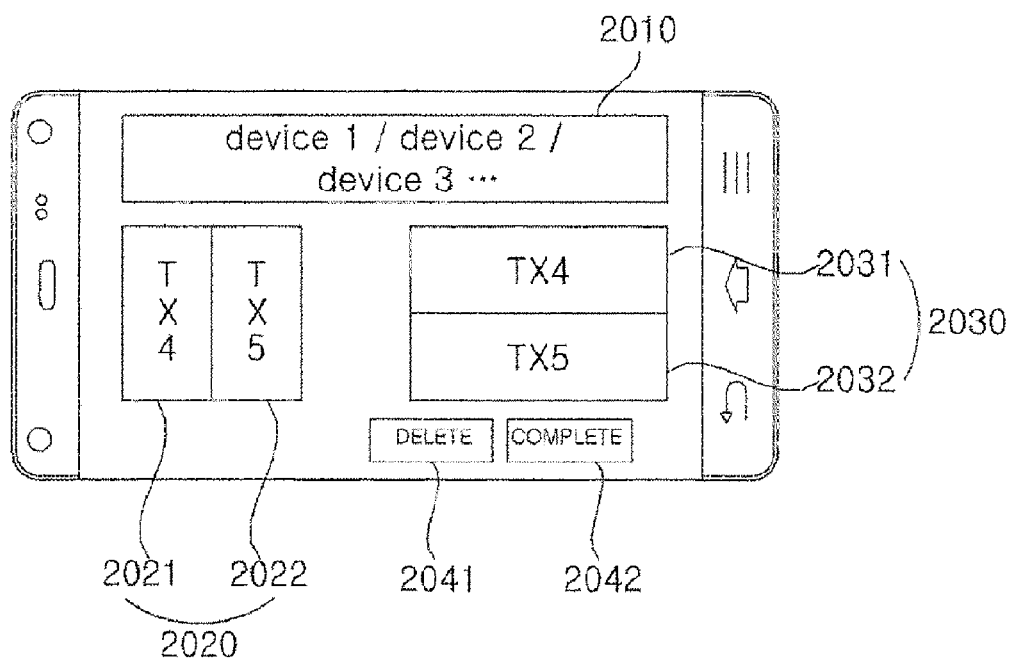
[Fig. 21]
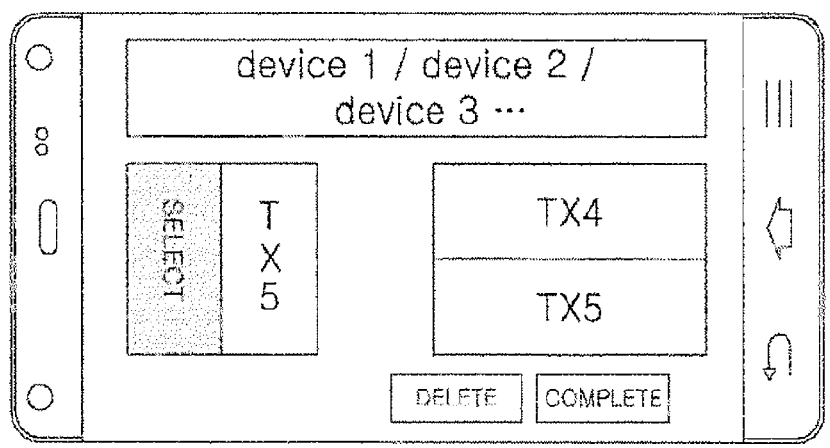

[Fig. 22]
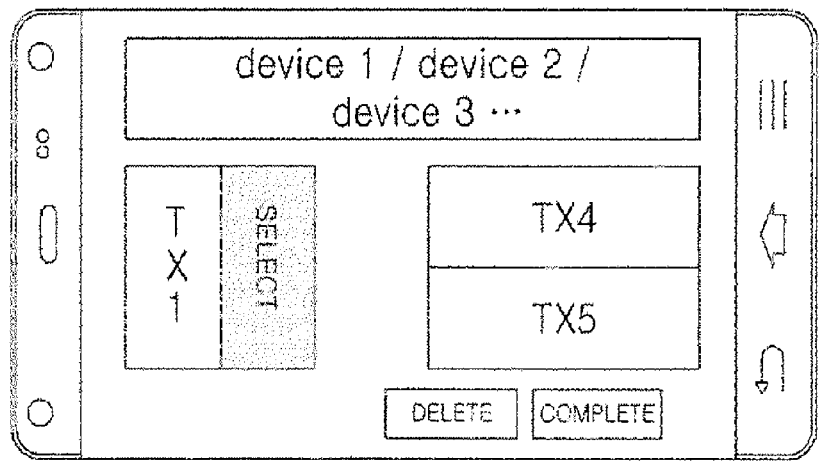
[Fig. 23]
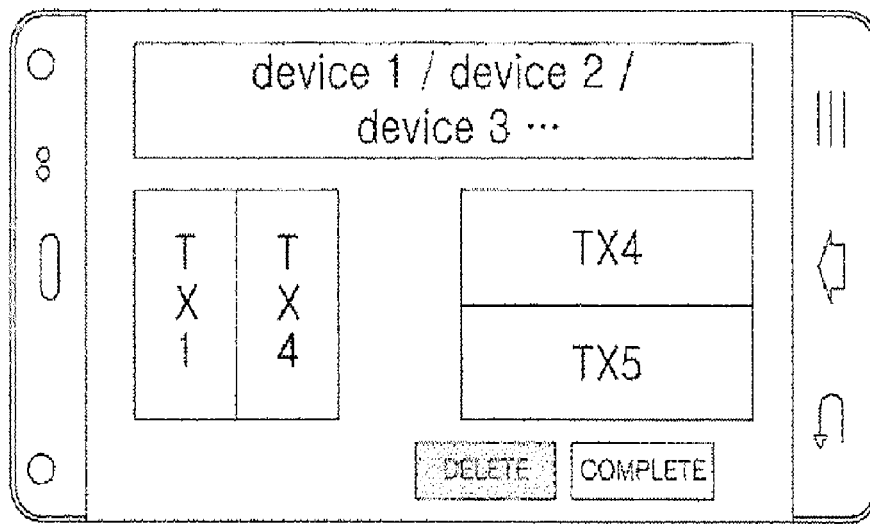

[Fig. 24]
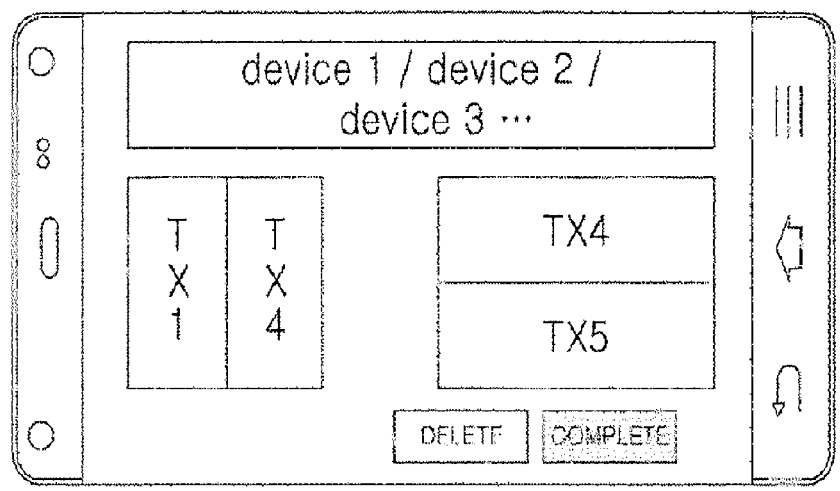
[Fig. 25]
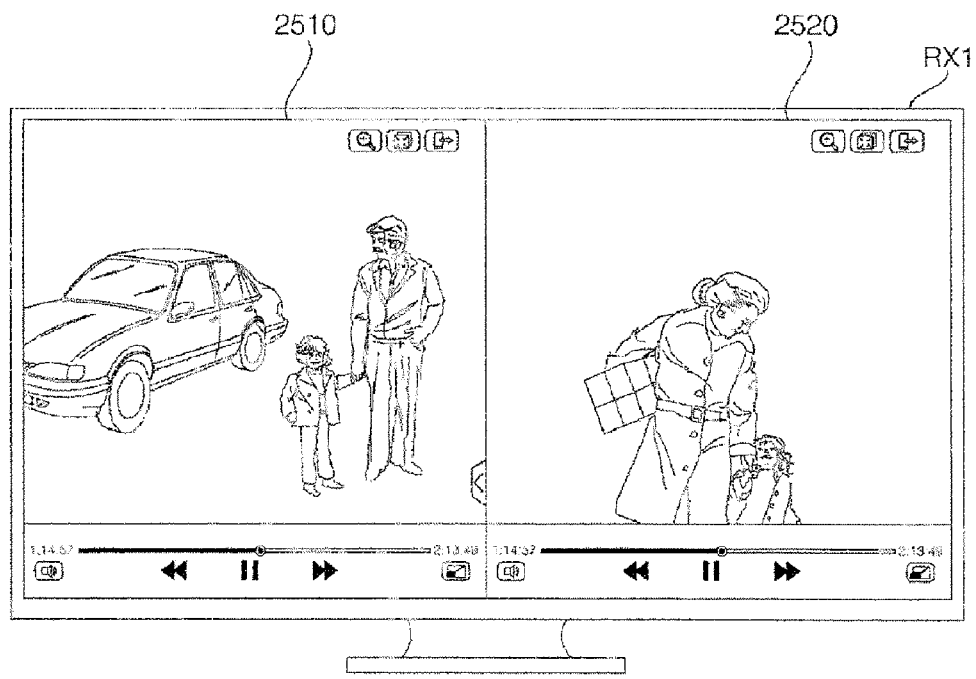

ELECTRONIC DEVICE AND METHOD FOR OPERATING THE SAME

CROSS-REFERENCE TO RELATED PATENT APPLICATIONS

This application is a U.S. National Stage Application under 35 U.S.C. § 371 of PCT Application No. PCT/KR2015/006169, filed Jun. 18, 2015, which claims priority to Korean Patent Application No. 10-2014-0119249, filed Sep. 5, 2014, whose entire disclosures are hereby incorporated by reference.

TECHNICAL FIELD

The present invention relates to an electronic device such as a mobile terminal and an image display device and a method for operating the same and, more specifically, to an electronic device and a method for operating the same to set a display screen of connected electronic devices easily and conveniently, thereby improving user convenience.

BACKGROUND ART

Mobile terminals are portable devices having at least one of a voice and video call function, an information input/output function and a data storage function. With the diversification of functions of mobile terminals, the mobile terminals are provided with complicated functions such as photographing of pictures or moving images, play of music files or video files, gaming, broadcast reception, wireless Internet, message transmission and reception and implemented in the form of a multimedia player. To realize complicated functions of mobile terminals implemented in the form of a multimedia player, various new hardware or software-based methods are being developed.

An image display device is a device having a function of displaying images that a user can view. The user can watch and listen to broadcast through the image display device. The image display device displays a broadcast corresponding to a broadcast signal, which is selected by the user from broadcast signals transmitted from broadcasting stations, on a display. The current broadcast trend is conversion to digital broadcasting from analog broadcasting worldwide. Digital broadcasting refers to transmission of digital video and audio signals. Digital broadcasting has small data loss owing to robustness to external noise, is advantageous in terms of error correction and provides high resolution and high-definition images, compared to analog broadcasting. In addition, digital broadcasting can provide interactive services, distinguished from analog broadcasting.

A network technology through which various electronic devices are connected to enable users to enjoy convenient, safe and economical life services indoors and outdoors at any time is under development.

Electronic devices can be connected using wired or wireless communication, and users can copy or move content between connected electronic devices and output the same content image through a plurality of electronic devices or output content through a screen of an electronic device that does not store the content.

DISCLOSURE OF INVENTION

Technical Problem

Therefore, the present invention has been made in view of the above problems, and it is an object of the present invention to provide an electronic device and a method for operating the same to easily set a display screen of a plurality of electronic devices which are connected, thereby improving user convenience.

Solution to Problem

In accordance with an aspect of the present invention, the above and other objects can be accomplished by the provision of a method for operating an electronic device, including: entering a content sharing mode capable of sharing content with a first electronic device; outputting first content shared with the first electronic device; entering a content sharing mode capable of sharing content with a second electronic device; determining the authority to decide a display layout, with respect to the second electronic device; transmitting display layout information to the second electronic device upon determining that the second electronic device has the authority to decide the display layout; and receiving, from the second electronic device, display layout determination information including information on output positions of content shared with the first and second electronic devices.

In accordance with an aspect of the present invention, there is provided a method for operating an electronic device, including: entering a content sharing mode for sharing content with a fourth electronic device outputting third content shared with a third electronic device; determining the authority to decide a display layout, with respect to the forth electronic device; receiving display layout information from the fourth electronic device upon determining that the fourth electronic device does not have the authority to decide the display layout; displaying a menu screen through which a display layout of the fourth electronic device is determined; receiving user input for determining the display layout of the fourth electronic device; and transmitting, to the fourth electronic device, display layout information including information on an output position of content of the fourth electronic device.

Advantageous Effects of Invention

According to the present invention, it is possible to provide various optimized display layouts of a screen displaying content of a plurality of electronic devices which are connected.

In addition, according to the present invention, it is possible to easily set a display screen of a plurality of electronic devices which are connected, thereby improving user convenience.

BRIEF DESCRIPTION OF DRAWINGS

The above and other objects, features and other advantages of the present invention will be more clearly understood from the following detailed description taken in conjunction with the accompanying drawings, in which:

FIG. 1 illustrates exemplary electronic devices that can be connected through a wired/wireless network according to an embodiment of the present invention;

FIG. 2 is a block diagram of an image display device according to an embodiment of the present invention;

FIG. 3 is a block diagram of the controller shown in FIG. 2;

FIG. 4 is a block diagram of a mobile terminal according to an embodiment of the present invention;

FIG. 5 is a flowchart illustrating a method for operating an electronic device according to an embodiment of the present invention;

FIG. 6 is a flowchart illustrating a method for operating an electronic device according to an embodiment of the present invention; and FIGS. 7 to 25 are views for explaining various embodiments of methods for operating an electronic device according to the present invention.

BEST MODE FOR CARRYING OUT THE INVENTION

The present invention will now be described in more detail with reference to the attached drawings.

The terms "module" and "unit" used to signify components are used herein to aid in understanding of the components and thus they should not be considered as having specific meanings or roles. Accordingly, the terms "module" and "unit" may be used interchangeably.

FIG. 1 illustrates exemplary electronic devices that can be connected through a wired/wireless network according to an embodiment of the present invention;

The electronic devices shown in FIG. 1 are exemplary and the present invention is not limited thereto. Referring to FIG. 1, electronic devices 100a, 100b, 300, 400, 500a and 500b, such as TVs 100a and 100b, a tablet PC 300, a notebook computer 400 and a smartphone 500, according to the present invention can transmit and receive data and share data through a wired/wireless communication network.

In addition, the electronic devices according to the present invention can not only one-to-one share content with other electronic devices and one-to-one output content but also one-to-N or N-to-N share content with a plurality of electronic devices and one-to-N or N-to-N output content.

The electronic devices according to an embodiment of the present invention can be directly connected or connected via a predetermined server.

While the TVs 100a and 100b are exemplified as a typical example of an image display device and the smartphone 500 is exemplified as a mobile terminal in FIG. 1, the present invention is not limited thereto.

The tablet PC 300, notebook computer 400, smartphones 500a and 500b, a navigation system and the like, in addition to the TVs 100a and 100b and a monitor which are typical image display devices are electronic devices including a display and thus may correspond to an image display device 100 in the present specification.

Further, since the tablet PC 300, notebook computer 400, smartphones 500a and 500b, a cellular phone, a PDA and the like are potable, these devices can correspond to the mobile terminal 500 in the specification.

FIG. 2 is a block diagram of the image display device 100.

Referring to FIG. 2, the image display device 100 according to an embodiment of the present invention may include a broadcast receiver 105, a network interface 130, an external device interface 130, a storage unit 140, a user input interface 150, a controller 170, a display 180 and an audio output unit 185.

The image display device 100 according to an embodiment of the present invention may further include an NFC module 125, a sensor unit (not shown), a camera (not shown) and the like as necessary.

The broadcast receiver 105 may include a tuner 110 and a demodulator 120. Further, the broadcast receiver 105 may be designed in such a manner that the broadcast receiver 105 does not include the network interface 130 while having the tuner 110 and the demodulator 120 or does not include the tuner 110 and the demodulator 120 while having the network interface 130, as necessary.

The tuner 110 tunes to radio-frequency (RF) broadcast signals, which correspond to channels selected by a user or all pre-stored channels, from among RF broadcast signals received through an antenna. The tuner 110 converts the selected RF broadcast signals into intermediate frequency signals, baseband video or audio signals.

For example, the tuner converts the selected RF broadcast signals into digital IF (DIF) signals when the selected RF broadcast signals are digital broadcast signals and converts the selected RF broadcast signals into analog baseband video or audio signals CVBS/SIF when the selected RF broadcast signals are analog broadcast signals. That is, the tuner 110 can process digital broadcast signals or analog broadcast signals. The analog baseband video or audio signals CVBS/SIF output from the tuner 110 may be directly input to the controller 170.

In addition, the tuner 110 can receive single-carrier RF broadcast signals according to ATSC (Advanced Television System Committee) or multi-carrier RF broadcast signals according to DVB (Digital Video Broadcasting).

The tuner 110 may sequentially tune to RF broadcast signals corresponding to broadcast channels stored through a channel memory function, from among RF broadcast signals received through the antenna, and convert the selected RF broadcast signals into IF signals or baseband video or audio signals.

The image display may include a plurality of tuners for receiving broadcast signals of a plurality of channels or a single tuner capable of simultaneously receiving broadcast signals of a plurality of channels.

The demodulator 120 receives and demodulates digital IF (DIF) signals converted by the tuner 110.

The demodulator 120 can perform demodulation and channel decoding and then output stream signals TS. Here, the stream signals may be multiplexed signals of video signals, audio signals or data signals.

The stream signals output from the demodulator 120 may be input to the controller 170. The controller 170 performs demultiplexing, video/audio signal processing and the like and then outputs images to the display 180 and outputs sounds to the audio output unit 185.

The external device interface 130 can transmit/receive data to/from a connected external device. To this end, the external device interface 130 may include an A/V input/output unit (not shown) or a radio communication unit (not shown).

The external device interface 130 can be connected to external devices such as a DVD (Digital Versatile Disc) player, Bluray, game console, camera, camcorder, computer (notebook computer) and set-top box in a wired/wireless manner and may perform input/output operations with respect to the external devices.

The A/V input/output unit can receive video and audio signals of external devices. The radio communication unit can perform short-range radio communication with other electronic devices.

The network interface 135 provides an interface for connecting the image display device 100 to a wired/wireless network including the Internet. For example, the network interface 135 can receive content or data provided by the Internet, a content provider or a network operator through a network.

The network interface 135 can perform data communication with neighboring electronic devices around the image display device 100. Here, the network interface 135 may receive device information of other electronic devices, information on remotely controllable channels of other electronic devices, frequency information or code information of other electronic devices, and the like.

The image display device 100 may include the NFC module 125 for near-field communication (NFC) between the image display device 100 and another electronic device such as the mobile terminal 500.

The image display device 100 may receive device information of other electronic devices, network information and the like through the NFC module 125. The image display device 100 may be connected to the corresponding electronic devices through a network on the basis of the information on the electronic devices.

The storage unit 140 may store programs for signal processing and control in the controller 170, signal-processed images, and audio or data signals.

Further, the storage unit 140 may temporarily store video, audio or data signals input through the external device interface 130. In addition, the storage unit 140 may store information on predetermined broadcast channels through a channel memory function such as a channel map.

While FIG. 2 shows an embodiment in which the storage unit 140 is provided separately from the controller 170, the scope of the present invention is not limited thereto. The storage unit 140 may be included in the controller 170.

The user input interface 150 transfers a user input signal to the controller 170 or transfers a signal from the controller 170 to the user.

For example, the user input interface 150 can transmit/receive user input signals such as a power on/off signal, channel selection signal and screen setting signal to/from a remote controller 200, transfer a user input signal input through a local key (not shown) such as a power key, channel key, volume key or set-up key to the controller 170, transfer a user input signal input from a sensor (not shown) for sensing user gesture, or transmit a signal from the controller 170 to the sensor (not shown).

The user input interface 150 can receive personal information from the remote controller 200 according to an embodiment of the present invention. Further, the user input interface 150 may further receive information on a web server accessed using the personal information.

For example, when the mobile terminal 500 and the remote controller 200 approach each other within a predetermined distance to perform near-field communication, the remote controller 200 can receive personal information stored in the mobile terminal 500. In addition, the remote controller 200 can transmit the personal information to the image display device 100 using an IR or RF method. Here, the user input interface 150 transfers the received personal information to the controller 170.

The personal information may include a user ID, password, and user e-mail with respect to the mobile terminal 500. The personal information may include a user ID, password, and user e-mail with respect to the image display device 100. Further, the personal information may be personal ID information or password information that can be commonly used in electronic devices including the mobile terminal 500. The personal information may be a personal ID, password and the like with respect to a predetermined web server, which are prestored in the mobile terminal 500. The personal information may be a personal ID, password and the like with respect to a predetermined web server, which can be used in the image display device 100 and the mobile terminal 500. The personal information may be a personal ID, password and the like with respect to a server connected to the image display device 100.

That is, the personal information may be information necessary to log in an electronic device or service with a predetermined account.

The user input interface 150 may receive, from electronic devices around the image display device 100, device information of the electronic devices, remote controllable channel information, frequency information or code information of the electronic devices, which are transmitted from the remote controller 200.

The controller 170 can generate and output signals for video or audio output by demultiplexing streams input through the tuner 110, demodulator 12 or external device interface 130 or processing demultiplexed signals.

A video signal processed by the controller 170 can be input to the display 80 and displayed as an image corresponding to the video signal. Further, the video signal processed by the controller 170 may be applied to an external output device through the external device interface 130.

An audio signal processed by the controller 170 can be output to the audio output unit 185 as sound. Further, the audio signal processed by the controller 170 can be applied to the external output device through the external device interface 130.

The controller 170 may include a demultiplexer, an image processor and the like, which are not shown in FIG. 2. This will be described later with reference to FIG. 3.

In addition, the controller 170 can control overall operation of the image display device 100. For example, the controller 170 can control the tuner 110 to tune to RF signals corresponding to channels selected by the user or prestored channels.

Further, the controller 170 can control the image display device 100 according to a user command input through the user input interface 150 or an internal program.

The controller 170 can control the display 180 to display an image. Here, the image displayed on the display 180 may be a still image or a moving image and a 2D image or a 3D image.

The controller 170 can control a predetermined object included in images displayed on the display 180 to be generated as a 3D object and displayed. For example, the object may be at least one of an accessed website (newspaper, magazine or the like), electronic program guide (EPG), menu, widget, icon, still image, moving image and text.

The controller 170 can detect the location of the user on the basis of an image photographed by a photographing unit (not shown). For example, the controller 170 can detect the distance (z-axis coordinate) between the user and the image display device 100. In addition, the controller 170 can detect x-axis and y-axis coordinates in the display 180, which correspond to the location of the user.

The controller 170 can control login on the basis of personal information received from the remote controller 200 according to an embodiment of the present invention. Here, login may be logging into the image display device 100, logging into a server connected to the image display device 100 or logging into a predetermined web server using the personal information.

For example, when the image display device 100 is logged into using personal ID information and password information received from the remote controller 200, the controller 170 can control the image display device 100 to display an individual screen set per user account on the display 180. When an image being viewed by the user is present, the controller 170 can control the image display device 100 to display the individual screen along with the image. Alternatively, the controller 170 may control the image display device to change the image to the individual screen.

When a server connected to the image display device 100 is logged into, the controller 170 can control a server access screen received from the server to be displayed on the display 180. Specifically, the server access screen may be an application server screen. When an image being viewed by the user is present, the controller 170 can control the server access screen to be displayed along with the image. Alternatively, the controller 170 may control the image display device to change the image to the server access screen.

When the received personal information is personal information about predetermined web servers connected to another electronic device, specifically, the mobile terminal 500, the controller 170 can control the image display device 100 to be connected to the web servers and to display screens with respect to the connected web servers on the display 180. The web servers may be web servers providing social network services. When an image being viewed by the user is present, the controller 170 can control the screens with respect to the connected web servers to be displayed along with the image. The controller 170 may control the image display device 100 to change the image to the screens with respect to the connected web servers.

When the image display device 100 is powered off while the personal information has been received, the controller 170 can control a power supply unit (not shown) to turn on the image display device 100. That is, when personal information is received through the user input interface 150 in a standby mode, the controller 170 can switch the standby mode to a wake-up mode to control the power supply unit to supply power to modules or units of the image display device 100.

The controller 170 can determine whether an electronic device has been connected to the image display device 100 according to personal information transmitted from the remote controller 200 and control an object indicating login of an electronic device to be displayed on the display 180, on the basis of device information and setup information of electronic devices around the image display device 100 and remote controllable channel information, frequency information or code information of other electronic devices, which are received through the network interface 135 or the user input interface 150.

In addition, the controller 170 can control device information and setup information of electronic devices around the image display device 100 and remote controllable channel information, frequency information or code information of other electronic devices to be transmitted to the remote controller 200 on the basis of the device information, setup information, channel information, frequency information or code information.

The image display device 100 may further include a channel browsing processor for generating a thumbnail image corresponding to a channel signal or an external input signal. The channel browsing processor can receive a stream signal TS output from the demodulator 120 or a stream signal output from the external device interface 130 and extract an image from the received stream signal to generate a thumbnail image. The generated thumbnail image can be stream-decoded along with decoded images and input to the controller 170. The controller 170 can display a thumbnail list including a plurality of thumbnail images on the display 180 using the input thumbnail image.

The thumbnail list can be displayed according to an easy view method in which the thumbnail list is displayed in a portion of the display 180 with a predetermined image displayed on the display 180, or a total view method in which the thumbnail list is displayed throughout the entire area of the display 180. Thumbnail images included in the thumbnail list can be sequentially updated.

The display 180 converts a video signal, a data signal, an OSD signal and a control signal processed by the controller 170 or a video signal, a data signal and a control signal received through the external device interface 130 to generate driving signals.

The display 180 can be a PDP, an LCD, an OLED, a flexible display or the like and may be a 3D display.

The display 180 may be implemented as a touchscreen to be used as an input device as well as an output device.

The audio output unit 185 receives an audio-processed signal from the controller 170 and outputs the signal as sound.

The photographing unit (not shown) photographs the user. While the photographing unit (not shown) can be implemented as a single camera, the present invention is not limited thereto and the photographing unit (not shown) may be implemented as a plurality of cameras. The photographing unit (not shown) can be embedded in a lower portion of the display 180 of the image display device 100 or provided separately from the image display device 100. Image information obtained by the photographing unit (not shown) can be applied to the controller 170.

The controller 170 can sense a gesture of the user on the basis of an image captured by the photographing unit (not shown), a signal sensed by a sensing unit (not shown) or a combination thereof.

The remote controller 200 transmits user input to the user input interface 150. To this end, the remote controller 200 can use Bluetooth, RF (Radio Frequency) communication, infrared (IR) communication, UWB (Ultra Wideband), Zig-Bee, NFC, etc.

In addition, the remote controller 200 can receive video, audio or data signals output from the user input interface 150. The remote controller 200 can display images or output sound on the basis of the received video, audio or data signals.

The remote controller 200 according to an embodiment of the present invention can receive personal information through near-field communication with a predetermined electronic device. The personal information may be personal ID information and password information that can be used for the mobile terminal 500, image display device 200 or other electronic devices, as described above. Here, while the personal information may be different for respective devices, the description focuses on one unified personal ID and password in embodiments of the present invention.

The remote controller 200 can transmit the received personal information to the image display device 100. Here, IR or RF can be used as a communication method.

In embodiments of the present invention, description focuses on a remote controller capable of indicating a pointer corresponding to motion of the user as the remote controller 200. That is, the remote controller 200 can transmit personal information and the like to the image display device 100 using RF.

The remote controller 200 may further include information on a web server being accessed using the personal information in addition to the personal information. For example, the remote controller 200 can receive information on a social network service web server being accessed by the mobile terminal 500. This web server information is transmitted to the image display device 100.

The remote controller 200 may receive, from other electronic devices around the image display device 100, device information, controllable channel information, frequency information or code information of the electronic devices. The remote controller 200 can perform remote control by allocating a channel, frequency or code to a corresponding electronic device on the basis of the aforementioned information of the other electronic devices.

The image display device 100 may be a fixed or mobile digital broadcast receiver.

The block diagram of the image display device 100, shown in FIG. 2, is one embodiment of the present invention. Components of the block diagram may be integrated, added or omitted according to specifications of the image display device 100 as actually implemented. That is, two or more components can be combined into one component or one component can be subdivided into two or more components as necessary. A function executed by each block is for description of embodiments of the present invention and detailed operation or device of each block does not limit the scope of the present invention.

The image display device 100 may not include the tuner 110 and the demodulator 120 shown in FIG. 2, may receive video content through the network interface 130 or the external device interface 135 and play the video content. FIG. 3 is a block diagram of the controller shown in FIG. 2.

Referring to FIG. 3, the controller 170 according to an embodiment of the present invention may include a demultiplexer 310, a video processor 320, a processor 330, an OSD generator 340, a mixer 345, a frame rate converter 350 and a formatter 360. In addition, the controller 170 may further include an audio processor (not shown) and a data processor (not shown).

The demultiplexer 310 demultiplexes an input stream. For example, when MPEG-2 TS is input to the demultiplexer 310, the demultiplexer 310 can demultiplex the MPEG-2 TS to divide the MPEG-2 TS into video, audio and data signals. Here, the stream signal input to the demultiplexer 310 may be a stream signal output from the tuner 110, the demodulator 120 or the external device interface 130.

The video processor 320 can process the demultiplexed video signal. To this end, the video processor 320 may include a video decoder 325 and a scaler 335.

The video decoder 325 decodes the demultiplexed video signal and the scaler 335 scales the resolution of the decoded video signal such that the display 180 can output the decoded video signal.

The video decoder 325 may include various types of decoders.

The processor 330 can control operations of the image display device 100 or the controller 170. For example, the processor 330 can control the tuner 110 to tune to RF broadcast signals corresponding to channels selected by the user or prestored channels.

In addition, the processor 330 can control the image display device 100 according to a user command input through the user input interface 150 of an internal program.

Further, the processor 330 can control data transmission between the image display device 100 and the network interface 135 or the external device interface 130.

Moreover, the processor 330 can control operations of the demultiplexer 310, video processor 320 and OSD generator 340 included in the controller 170.

The OSD generator 340 generates an OSD signal according to user input or autonomously. For example, the OSD generator 340 can generate signals for displaying various types of information on the display 180 as graphics or text. The OSD signal generated by the OSD generator may include data regarding a user interface screen, various menu screens, widgets, icons and the like of the image display device 100. In addition, the generated OSD signal may include a 2D object or a 3D object.

Further, the OSD generator 340 can generate a pointer that can be displayed on the display 180 on the basis of a pointing signal input from the remote controller 200. Particularly, the pointer can be generated by a pointing signal processor (not shown) and the OSD generator 340 can include the pointing signal processor. The pointing signal processor (not shown) may be provided separately from the OSD generator 340 instead of being included in the OSD generator 340.

In an embodiment of the present invention, the OSD generator 340 can generate or configure a set individual screen when the user log into the image display device 100. When the user logs into a server connected to the image display device 100, the OSD generator 340 can generate or configure at least part of a server access screen received from the server such that the display 180 displays the server access screen. Further, the OSD generator can generate or configure at least part of a web server access screen on the basis of information on a web server being accessed using personal information.

The mixer 345 can mix the OSD signal generated by the OSD generator 340 and the decoded video signal processed by the video processor 320. Here, the OSD signal and the decoded video signal can respectively include at least one of a 2D signal and a 3D signal. The mixed video signal is provided to the frame rate converter 350.

The frame rate converter (FRC) 350 can convert a frame rate of an input image. The frame rate converter 350 may output the input image without converting the frame rate thereof.

The formatter 360 receives the signal mixed by the mixer 345, that is, the OSD signal and the decoded video signal, and changes the format of the received signal. For example, the formatter 360 can output RGB data signals. The RGB data signals can be output as low voltage differential signaling (LVDS) or mini-LVDS.

The formatter 360 can separate a 2D video signal and a 3D video signal from each other for 3D image display. Further, the formatter 360 may change the format of a 3D video signal or convert a 2D video signal into a 3D video signal.

The audio processor (not shown) included in the controller 170 can process the demultiplexed audio signal. To this end, the audio processor (not shown) can include various decoders.

Further, the audio processor (not shown) included in the controller 170 can control bass, treble, volume and the like.

The data processor (not shown) included in the controller 170 can process the demultiplexed data signal. For example, when the demultiplexed data signal is an encoded data signal, the data processor (not shown) can decode the encoded data signal. The decoded data signal may be EPG information including broadcast information such as a start time and an end time of a broadcast program broadcast on each channel.

While FIG. 3 shows that the signals from the OSD generator 340 and the video processor 320 are mixed by the mixer 345 and then 3D-processed by the formatter 360, the present invention is not limited thereto and the mixer 345 may be located after the formatter 360.

The block diagram of the controller 170, shown in FIG. 3, is one embodiment of the present invention. Components in the block diagram may be integrated, added or omitted according to configuration of the controller 170 as actually implemented.

Particularly, the frame rate converter 350 and the formatter 360 may be respectively provided separately from the controller 170 instead of being included in the controller 170.

FIG. 4 is a block diagram of a mobile terminal according to an embodiment of the present invention.

The mobile terminal described in the specification may include a cellular phone, a smartphone, a notebook computer, a terminal for digital broadcast, a personal digital assistant (PDA), a portable multimedia player (PDP), a camera, a navigation system, a tablet computer, an e-book terminal and the like.

FIG. 4 is a block diagram of a mobile terminal according to an embodiment of the present invention. A description will be given of functional components of the mobile terminal according to an embodiment of the present invention with reference to FIG. 4.

Referring to FIG. 4, the mobile terminal 500 may include a radio communication unit 510, an audio/video (A/V) input unit 520, a user input unit 530, a sensing unit 540, an output unit 550, a memory 560, an interface 570, a controller 580 and a power supply unit 590. Two or more of these components may be unified into one component or one component may be subdivided into two or more components as necessary when the mobile terminal is actually implemented.

The radio communication unit 510 may include a broadcast reception module 511, a mobile communication module 513, a wireless Internet module 515, a short-range communication module 517 and a GPS module 519.

The broadcast reception module 511 receives at least one of a broadcast signal and broadcast related information from an external broadcast management server through a broadcast channel. Here, the broadcast channel may include a satellite channel, a terrestrial channel and the like. The broadcast management server may refer to a server that generates and transmits at least one of a broadcast signal and broadcast related information or a server that receives at least one of a pre-generated broadcast signal and broadcast related information and transmits the received signal to a terminal.

The broadcast signal may include not only a TV broadcast signal, a radio broadcast signal and a data broadcast signal but also a broadcast signal in the form of a combination of a radio broadcast signal and a data broadcast signal. The broadcast related information may refer to information related to a broadcast channel, a broadcast program or a broadcast service provider. The broadcast related information may be provided through a mobile communication network. In this case, the broadcast related information may be received through the mobile communication module 513. The broadcast related information can be present in various forms.

The broadcast reception module 511 receives broadcast signals using various broadcast systems. In particular, the broadcast reception module 511 can receive digital broadcast signals using digital broadcast systems such as DMB-T (Digital Multimedia Broadcasting-Terrestrial), DMB-S (Digital Multimedia BroadcastingSatellite), MediaFLO (Media Forward Link Only), DVB-H (Digital Video BroadcastHandheld) and ISDB-T (Integrated Services Digital Broadcast-Terrestrial). In addition, the broadcast reception module 511 can be configured to be adapted to any broadcast system providing broadcast signals as well as the digital broadcast systems. Broadcast signals and/or broadcast related information received through the broadcast reception module 511 can be stored in the memory 560.

The mobile communication module 513 transmits/receives radio signals to/from at least one of a base station, an external terminal and a server on a mobile communication network. Here, the radio signals may include a voice call signal, a video call signal or various types of data according to text/multimedia message transmission and reception.

The wireless Internet module 515 refers to a module for wireless Internet access and may be included in the mobile terminal or provided to the outside of the mobile terminal 500. WLAN (Wireless LAN)(Wi-Fi), WiBro (Wireless broadband), WiMAX (World Interoperability for Microwave Access), HSDPA (High Speed Downlink Packet Access) and the like can be used as wireless Internet technology.

The short-range communication module 517 refers to a module for short-range communication. Bluetooth, RFID (Radio Frequency Identification), IrDA (Infrared Data Association), UWB (Ultra Wideband), ZigBee, NFC (Near Field Communication) and the like can be used as short-range communication technology.

The GPS (Global Position System) module 519 receives location information from a plurality of GPS satellites.

The A/V input unit 520 is a component for audio signal or video signal input and may include a camera 521 and a microphone 523. The camera 521 processes video frames such as still images or moving images obtained by an image sensor in a video call mode or a photographing mode. The processed video frames can be display through a display 551.

The video frames processed by the camera 521 may be stored in the memory 560 or transmitted to the outside through the radio communication unit 510. The mobile terminal 500 may include two or more cameras 521 according to specifications thereof.

The microphone 523 receives external audio signals in an audio reception mode, for example, a call mode, a recording mode or a voice recognition mode and processes the external audio signals into electrical audio data. The processed audio data can be converted into data that can be transmitted to a mobile communication base station and output to the mobile communication base station through the mobile communication module 513 in the call mode. The microphone 123 can use various noise reduction algorithms for removing noise generated in a process of receiving external audio signals.

A plurality of microphones 523 may be arranged at different positions. Audio signals received through the microphones may be processed by the controller 580.

The user input unit 530 generates key input data corresponding to user input for controlling operation of the mobile terminal. The user input unit 530 may be configured in the form of a keypad, a dome switch, a touchpad (static pressure/capacitive) or the like, which can receive a command or information according to push or touch of the user. In addition, the user input unit 530 may be configured in the form of a jog wheel or jog dial that rotates a key, a joystick, a finger mouse or the like. Particularly, when the touchpad and the display 551, which will be described later, are configured in a layered structure, this may be called a touchscreen.

The sensing unit 540 senses the current state of the mobile terminal 500, such as open/closed state of the mobile terminal 500, location of the mobile terminal 500 and whether the mobile terminal 500 is touched by the user, and generates a sensing signal for controlling operation of the mobile terminal 500. For example, when the mobile terminal 500 is a slide phone, the sensing unit 540 can sense whether the slide phone is opened or closed. In addition, the sensing unit 540 can execute sensing functions for sensing power supply of the power supply unit 590, connection of the interface 570 with an external device and the like.

The sensing unit 540 may include a proximity sensor 541, a pressure sensor 543, a motion sensor 545 and the like. The proximity sensor 541 senses an object approaching the mobile terminal 500, an object present near the mobile terminal 500 and the like without mechanical contact. The proximity sensor 541 can sense an object in proximity to the mobile terminal 500 using an AC magnetic field variation or capacitance variation. The sensing unit 540 may include two or more proximity sensors 541 according to configuration thereof.

The pressure sensor 543 can sense whether pressure is applied to the mobile terminal 500 and the strength of the pressure. The pressure sensor 543 can be provided to a portion of the mobile terminal 500, at which pressure sensing is needed, according to environment in which the mobile terminal is used. When the pressure sensor 543 is provided to the display 551, touch input applied through the display 551 can be discriminated from pressure touch input stronger than the touch input according to a signal output from the pressure sensor 543. Further, intensity of pressure applied to the display 551 when pressure touch input is applied thereto can be recognized according to a signal output from the pressure sensor 543.

The motion sensor 545 senses location or motion of the mobile terminal 500 using an acceleration sensor, a gyro sensor or the like. The acceleration sensor used as the motion sensor 545 is an element that converts acceleration in one direction into an electrical signal and is widely used with the development of micro-electromechanical system (MEMS) technology.

There are a wide range of acceleration sensors from an acceleration sensor included in an airbag system of vehicles to measure a large acceleration value used to sense collision to an acceleration sensor for measuring a fine acceleration value as input of a game by recognizing fine motion of a user's hand. The acceleration sensor is configured in such a manner that acceleration sensors of 2 or 3 axes are mounted in one package. Only a Z-axis acceleration sensor may be needed according to environment in which the acceleration sensor is used. Accordingly, when an X-axis or Y-axis acceleration sensor needs to be used instead of a Z-axis acceleration sensor, the acceleration sensor may be vertically mounted on a main board using an additional piece block.

The gyro sensor is a sensor for measuring angular velocity and can sense an angle with respect to a reference direction.

The output unit 550 is a component for output of an audio signal, video signal or alarm signal. The output unit 550 may include the display 551, an audio output module 553, an alarm 555 and a haptic module 557.

The display 551 displays information processed in the mobile terminal 500. For example, when the mobile terminal 500 is in the call mode, the display 551 displays a user interface (UI) or a graphical user interface (GUI) related to a corresponding call. When the mobile terminal 500 is in the video call mode or photographing mode, the display 551 can display photographed or received images respectively or simultaneously and displays a UI or GUI.

As described above, when the display 551 and a touchpad are configured in a layered structure to form a touchscreen, the display 551 may be used as an input device through which information can be input according to touch of the user, as well as an output device.

When the display 551 is configured as a touchscreen, the display 551 can include a touchscreen panel, a touchscreen panel controller, etc. In this case, the touchscreen panel is a transparent panel attached to the outside of the mobile terminal 500 and can be connected to an internal bus of the mobile terminal 500. When touch input is applied, the touchscreen panel sends signals corresponding to the touch input to the touchscreen panel controller. The touchscreen panel controller processes the signals and then transmits data corresponding to the processed signals to the controller 580 such that the controller 580 can recognize the touch input and a portion of the touchscreen to which the touch input is applied.

The display 551 may be configured as e-paper. The e-paper is a kind of reflective display and has high resolution like conventional paper and ink, a wide viewing angle and excellent visual characteristics owing to bright white background. The e-paper can be implemented on any substrate such as plastic, metal and paper, sustain images even after powered off and maintain battery life of the mobile terminal 500 since a backlight is not present. The e-paper may use a charged hemispherical twist ball, electrophoresis, a microcapsule or the like.

In addition, the display 551 may include at least one of a liquid crystal display, a thin film transistor-liquid crystal display, an organic light-emitting diode, a flexible display and a 3D display. The mobile terminal 500 may include two or more displays 551 according to configuration of the mobile terminal 500. For example, the mobile terminal 500 can include an external display (not shown) and an internal display (not shown).

The audio output module 553 outputs audio data received through the radio communication unit 510 or stored in the memory 560 in a call signal reception mode, call mode or recording mode, voice recognition mode, broadcast reception mode. In addition, the audio output module 553 outputs audio signals related to functions executed in the mobile terminal 500, for example, call signal reception and message reception. The audio output module 553 may include a speaker, a buzzer and the like.

The alarm 555 outputs a signal for signaling an event generated in the mobile terminal 500. Examples of events generated in the mobile terminal 500 include call signal reception, message reception and key signal input. The alarm 555 outputs a signal for signaling event generation in a form different from that of an audio signal or a video signal. For example, the alarm 555 can output a signal in a vibration form. When a call signal or a message is received, the alarm 555 can output a signal for signaling call signal reception or message reception. When a key signal is input, the alarm 555 can output a signal as feedback to the key signal input. The user can recognize event generation through a signal output from the alarm 555. A signal for alarming generation of an event in the mobile terminal 500 may be output through the display 551 or the audio output module 553.

The haptic module 557 produces various tactile effects that the user can feel. A typical example of tactile effects produced by the haptic module 557 is vibration.

When the haptic module 557 generates vibration as a tactile effect, the intensity and pattern of the vibration generated by the haptic module 557 can be changed and different vibrations may be combined and output or sequentially output.

The haptic module 557 can produce various tactile effects other than vibration, such as stimulus according to arrangement of pins vertically moving on a contact skin surface, stimulus according to an air jet force or suction force through a jet orifice or inlet, stimulus applied to skin surface, stimulus according to contact of an electrode, stimulus using electrostatic force, and cooling/warming effects using a heat-emitting or heat-absorbing element. The haptic module 557 may be implemented in such a manner that not only can tactile effects be transferred to the user through direct contact but also the user can feel tactile effects through kinesthesia of their fingers or arms. The mobile terminal 500 may include two or more haptic modules 557 according to configuration thereof.

The memory 560 may store programs for processing and control of the controller 580 and temporarily store input or output data (e.g. phonebook, messages, still images, moving images and the like).

The memory 560 may include at least one storage medium of a flash memory, a hard disk, a micro type multimedia card, a card type memory (e.g. SD or XD memory), a RAM and a ROM. Further, the mobile terminal 500 may operate a web storage that executes the storage function of the memory 1509 over the Internet.

The interface 570 connects external devices to the mobile terminal 500. Examples of external devices connected to the mobile terminal 500 include a wired/wireless headset, an external charger, a wired/wireless data port, a card socket such as a memory card, a subscriber identity module (SIM) card and a user identity module (UIM), an audio I/O terminal, a video I/O terminal and an earphone. The interface 570 may receive data from these external devices, transfer the data to internal components of the mobile terminal 500 and transmit data of the mobile terminal 500 to the external devices.

When the mobile terminal 500 is connected to an external cradle, the interface 570 may serve as a path through which power from the connected cradle is supplied to the mobile terminal 500 or a path through which command signals input by the user through the cradle are transferred to the mobile terminal 500.

The controller 580 controls overall operation of the mobile terminal 500 by controlling operation of each component. For example, the controller 580 performs control and processing related to voice call, data communication, video call and the like. In addition, the controller 580 may include a multimedia playback module 581 for multimedia playback. The multimedia playback module 581 may be configured in the controller 580 as hardware or configured as software separately from the controller 580. The controller 580 may include an application processor (not shown) for executing applications. The application processor (not shown) may be provided separately from the controller 580.

The power supply unit 590 is provided with external power and internal power under the control of the controller 580 and supplies power necessary for operation of each component. The mobile terminal 500 having the aforementioned configuration can be implemented such that the mobile terminal 500 can operate in communication systems capable of transmitting data as frames or packets, including wired/wireless communication systems and satellite based communication systems.

Conventional content sharing technology limits a display layout to 1:1 display layout between TX (device that transmits images) and RX (device that receives and output images), wherein RX only receives and outputs images transmitted from TX since RX cannot decide display layout.

In the aforementioned conventional technology, TX should respectively handle display layouts for respective RXs, and transmission or output of images when a plurality of devices is connected is not considered.

The present invention relates to a method for determining and operating a display layout when TX that transmits images and RX that receives and outputs images are connected in 1:N, N:1 and N:N relationships.

FIG. 5 is a flowchart illustrating a method for operating an electronic device according to an embodiment of the present invention.

Referring to FIG. 5, the electronic device according to an embodiment of the present invention may enter a content sharing mode in which the electronic device can share content with a first electronic device (S510).

The electronic device according to an embodiment of the present invention may enter the content sharing mode according to command input of a user, for example, command input for executing a corresponding menu or application.

Here, the content sharing mode may refer to a mode in which the electronic device can transmit content to an external electronic device connected thereto in a wired or wireless manner or receive content transmitted from the external device.

The content sharing mode may include a mirroring mode in which connected electronic devices display the same image and a dual-screen dual-play (DSDP) mode in which content played by one of connected electronic devices can be used by the other electronic device and another operation can be performed in a content sharing state.

The electronic device according to the present invention can support open multimedia transmission technologies such as Wi-Fi certified Miracast™), Wi-Fi display (WFD) and wireless display (WiDi), introduced by Wi-Fi alliance, and share content according to standards thereof.

Data for content sharing can be directly transmitted to an external electronic device through wired/wireless communication according to various communication standards or transmitted to the external electronic device through an additionally connected web server.

The electronic device according to an embodiment of the present invention may receive information about content to be received from the first electronic device that has entered the content sharing mode and receive a content transmission acceptance request signal. The electronic device according to an embodiment of the present invention may transmit information about content to be transmitted to the first electronic device. In addition, the electronic device may transmit a content transmission acceptance request signal prior to transmission of content to the first electronic device. The content transmission acceptance request signal may include the information about the content.

The electronic device may output first content shared with the first electronic device (S520). That is, the electronic device according to the present embodiment may serve as a sink electronic device that receives video/audio data for content output from the first electronic device serving as a source electronic device for transmitting content, and outputs the video/audio data.

Electronic devices according to an embodiment of the present invention can share and output content in a 1:1, 1:N or N:N relationship.

The electronic device according to an embodiment of the present invention may enter the content sharing mode in which the electronic device can share content with a second electronic device while outputting the content received from the first electronic device (S530).

In this case, the electronic device needs to determine a display layout for output of a plurality of pieces of content in order to efficiently display the content.

Accordingly, the controller 170 or 580 may determine the authority to decide the display layout with respect to the second electronic device (S540). Here, the controller 170 or 580 may check whether a stored display layout policy is present with respect to the second electronic device or receive information display layout policy information from the second electronic device.

Further, the controller 170 or 580 may determine an electronic device having the authority to decide the display layout according to predetermined priority of the electronic devices.

For example, a mobile terminal likely to be held by a user's hand and manipulated can be assigned priority higher than that of a TV used at a fixed position such that the mobile terminal can have the authority to decide a display layout.

An electronic device serving as a source electronic device for transmitting content can be assigned priority higher than that of a sink electronic device for receiving and outputting video/audio data for content output such that the source electronic device has the authority to decide a display layout.

Alternatively, when the user applies manual input, it is possible to determine that an electronic device corresponding to the manual input of the user has the authority to decide a display layout.

When two or more electronic devices are connected and share content, a user can select an electronic device having the authority to decide a display layout since the user operates the electronic devices. In this case, at least one of electronic devices in the content sharing mode can output a menu screen through which the user selects an electronic device having the authority to decide a display layout.

When it is determined that the second electronic device has the authority to decide the display layout (S540), the controller 170 or 580 may control display layout information to be transmitted to the second electronic device (S550).

Here, the display layout information may include at least one of the number of electronic devices currently sharing content, information on supportable display layout, output size of the first content and a thumbnail image of the first content.

The electronic device may receive display layout determination information including output positions of the content shared with the first and second electronic devices, from the second electronic device having the authority to decide the display layout (S555).

In addition, the electronic device can receive data necessary for output of second content from the second electronic device (S570), arrange the two pieces of content received from the two electronic devices according to the determined display layout and output the content (S580). That is, the electronic device can output the first content and the second content at positions corresponding to the received content output position information (S580).

When it is determined that the second electronic device does not have the authority to decide the display layout (S540), that is, when the electronic device that will output content has the authority to decide the display layout, a menu screen through which display layout of the content shared with the first and second electronic devices can be determined can be displayed (S560).

The menu screen may include a plurality of sample display layouts.

When input for selecting one of the plurality of sample display layouts is received, output positions of the plurality of pieces of content can be automatically determined according to the selected sample display layout.

In this case, when the number of pieces of output content of the selected sample display layout is greater than the number of pieces of content to be output, predetermined content, for example, a predetermined advertisement image or video may be arranged in the remaining output position.

Alternatively, the electronic device can receive the input for selecting one of the sample display layouts and input for designating content output position in the selected sample display layout. That is, the user can designate a display layout and content arrangement positions in the layout.

In this case, when the number of pieces of output content of the selected sample display layout is greater than the number of pieces of content to be output, predetermined content, for example, a predetermined advertisement image or video may be arranged in the remaining output position.

The electronic device may receive user input for determining the display layout of the content shared with the first and second electronic devices (S565), receive data necessary to output the second content from the second electronic device (S570), arrange the two pieces of content received from the first and second electronic devices according to the determined display layout and output the content (S580).

Output screens and menu screens of electronic devices and operations between the electronic devices will be described in detail later with reference to FIGS. 7 to 25.

FIG. 6 is a flowchart illustrating a method for operating an electronic device according to the present invention.

Referring to FIG. 6, an electronic device according to an embodiment of the present invention may enter a content sharing mode in which the electronic device shares content with a fourth electronic device that outputs third content shared with a third electronic device (S610). That is, the electronic device may enter the content sharing mode in which the electronic device shares content with an electronic device that is outputting content based on data received from another electronic device.

The controller 170 or 480 may determine the authority to decide a display layout with respect to the fourth electronic device (S620).

As described above with reference to FIG. 5, the controller 170 or 580 can check whether a stored display layout policy is present with respect to the fourth electronic device or receive display layout policy information from the fourth electronic device.

The controller 170 or 580 can determine an electronic device having the authority to decide the display layout according to predetermined priority of the electronic devices, or determine that an electronic device corresponding to manual input of the user has the authority to decide the display layout when the user performs manual input.

In this case, at least one of electronic devices in the content sharing mode can output a menu screen through which the user selects an electronic device having the authority to decide the display layout.

When the controller 170 or 580 determines that the fourth electronic device does not have the authority to decide the display layout (S620), that is, when the electronic device is determined to have the authority to decide the display layout, the electronic device may receive display layout information from the fourth electronic device (S630).

Upon reception of the display layout information, the controller 170 or 580 may control a menu screen through which the display layout of the fourth electronic device can be determined to be displayed (S640). Here, the menu screen may include a plurality of sample display layouts.

When input for selecting one of the sample display layouts is received, output positions of a plurality of pieces of content can be automatically determined. Alternatively, it is possible to receive, from the user, input for selecting one of the sample display layouts and input for designating content output positions in the selected sample display layout.

According to an embodiment, when the number of pieces of output content of the selected sample display layout is greater than the number of pieces of content to be output, predetermined content, for example, a predetermined advertisement image or video can be arranged in the remaining output position.

Upon reception of user input for determining the display layout of the fourth electronic device (S650), the controller 170 or 580 may control display layout determination information including content output position information of the fourth electronic device to be transmitted to the fourth electronic device (S660).

Further, the controller 170 or 580 may control data necessary for output of fourth content to be transmitted to the fourth electronic device (S670). That is, the electronic device serves as a source electronic device that transmits content and can transmit video/audio data for output of predetermined content to the fourth electronic device serving as a sink electronic device.

Electronic devices according to the present invention can share and output content in a 1:1, 1:N or N:N relationship.

An electronic device serves as one of a sink electronic device and a source electronic device in the case of 1:1 connection, whereas an electronic device performs complex operation in the case of 1:N or N:N connection.

For example, the electronic device according to the embodiment illustrated in FIG. 5 can be identical to the electronic device according to the embodiment illustrated in FIG. 6, and one electronic device can sequentially perform operations shown in FIGS. 5 and 6. In this case, the electronic device can share content with the first, second and fourth electronic devices. Further, the electronic device can serve as a sink electronic device for the first electronic device and as a source electronic device for the fourth electronic device.

Alternatively, the electronic device according to the embodiment illustrated in FIG. 5 and the electronic device according to the embodiment illustrated in FIG. 6 may be devices that perform operations corresponding to each other.

In this case, the first electronic device may correspond to the third electronic device, the electronic device according to the embodiment illustrated in FIG. 5 may correspond to the fourth electronic device and the electronic device according to the embodiment illustrated in FIG. 6 may correspond to the second electronic device.

FIGS. 7 to 25 are views for explaining various embodiments of the methods for operating an electronic device according to the present invention.

Referring to FIG. 7, RX2 is connected to TX3 in a content sharing mode (S710) and outputs content (TX3 content) received from TX3 (S720).

For example, RX2 and TX3 can output the same content image in a mirroring mode, as shown in FIG. 8.

TX1, which is outputting content thereof (S725), as shown in FIG. 9, may enter the content sharing mode in which TX1 shares content with RX2 according to command input of a user (S730). For example, when the user inputs a content sharing mode entry command through TX1 or RX2, RX2 or TX1 is requested to be connected to the other device and then RX2 and TX1 enter the content sharing mode upon establishment of connection according to a reply of the requested device.

TX1 and RX2 in the content sharing mode determine the authority to decide a display layout (S740). The authority to decide the display layout may be determined through display layout decision negotiation between TX1 and RX2.

For example, TX1 and RX2 can check whether a stored display layout policy is present or receive display layout policy information from the counterpart device.

TX1 and RX2 may determine an electronic device having the authority to decide the display layout on the basis of predetermined priority of electronic devices according to the display layout policy or determine that an electronic device corresponding to manual input of the user has the authority to decide the display layout when the manual input of the user is applied.

FIG. 7 illustrates a case in which TX1 has the authority to decide the display layout.

RX2 may transmit, to TX1, display layout information necessary for the TX1 to determine the display layout since TX1 has the authority to decide the display layout (S750).

Here, the display layout information may include at least one of the number of electronic devices currently sharing content, information on supportable display layouts, output sizes of content received from other electronic devices and currently displayed, and thumbnail images of the content received from other electronic devices and currently displayed.

For example, elements of a display layout include the number of connected TX electronic devices and output image size information including {X, Y, width, height}. In this case, the following display layout information may be transmitted.

In the following display layout information, 'deviceNum' may refer to the number of supportable devices and may represent the number of output windows that can be included in the display layout. For example, when 'deviceNum' is determined as '2', a content sharing screen can be segmented for two pieces of content.

```
{
"layout_information" : [
{
"deviceNum" : 1,
"layout": [
{
"index" : 1,
"rects": [
{ "deviceId": "TX3", "x" : 0, "y" : 0, "width" : 200, "height" : 100 }
]
}
]
},
{
"deviceNum" : 2,
"layout": [
{
"index": 2,
"rects": [
{ "deviceId": "TX3", "x" : 0, "y" : 0, "width" : 100, "height" : 50 },
{ "deviceId": "", "x" : 0, "y" : 50, "width" : 100, "height" : 50 }
]
```

-continued

```
},
{
"index": 3,
"rects": [
{ "deviceId": "TX3", "x" : 0, "y" : 0, "width" : 50, "height" : 100 },
{ "deviceId": "", "x" : 50, "y" : 0, "width" : 50, "height" : 100 }
]
}
]
},
...
]
}
Only layouts for prearranged 'deviceNum' may be received.
{
"layout_information" : [
{
"deviceNum" : int,
"layout": [
{
"index": int,
"rects": [
{ "deviceId": string, "x" : int, "y" : int, "width" : int, "height" : int },
...
]
},
...
]
},
...
]
}
```

TX1 may display a menu screen through which a display layout of content output from RX2 can be determined (S760) and receive selection input of the user (S770).

FIGS. 10a to 14d illustrate exemplary menu screens and examples of determining a layout by the user.

While FIGS. 10a to 10d illustrate a case in which TX1 determines a display layout when 'deviceNum' is set to 3, the present invention is not limited thereto.

Referring to FIGS. 10a to 10d, a menu screen may include a plurality of sample display layouts 1020 and 1030 and menu items such as 'delete' 1041 and 'complete' 1042.

The menu screen may further include information 1010 about display layouts that can be supported.

The sample display layouts 1020 and 1030 arrange a plurality of pieces of content in different formats and a user can select one of the sample display layouts 1020 and 1030.

While FIGS. 10a, 10b and 10c illustrate an example in which each of the sample display layouts 1020 and 1030 is divided into three output regions 1021, 1022, 1023, 1031, 1032 and 1033 having a uniform area in the vertical or horizontal direction, the present invention is not limited thereto.

For example, various content arrangement formats can be set in such a manner that at least one of the three output regions is larger than the other regions or two pieces of content are arranged in the horizontal direction and one piece of content is arranged in the vertical direction.

Further, three or more display layouts may be provided and a menu through which the user can set their own display layout may be provided, distinguished from the example shown in the figures.

Upon reception of input for selecting one of the sample display layouts, output positions of a plurality of pieces of content can be automatically determined on the basis of the selected sample display layout.

For example, when the user selects the display layout 1020, the electronic device can automatically arrange content in the three regions 1021, 1022 and 1023 of the display layout 1020.

Further, input for selecting one of the sample display layouts and input for designating content output positions in the selected display layout may be received. That is, the user can directly designate a layout and content arrangement positions in the layout.

FIG. 10b illustrates a case in which the user selects the display layout 1020 and designates output of TX3 content through the first region 1021 and output of TX1 content through the second region 1022.

Referring to FIG. 10c, the user can complete display layout determination by selecting 'complete' 1042. Otherwise, the user can cancel selection of content assigned to the display layout by selecting 'delete' 1041.

Upon determination of the display layout, TX1 can transmit display layout determination information including output positions of shared content (TX1 content and TX3 content) to RX2 (S780).

TX1 can transmit video data, audio data and the like, which are necessary to output TX1 content, to RX2 (S785).

RX2 can receive the display layout determination information and data necessary to output first content from TX1, arrange and output TX1 content and TX3 content according to the display layout determination information.

Referring to FIG. 10d, TX3 content 1060 and TX1 content 1070 can be displayed according to the display layout selected in FIG. 10c.

When the number of content output regions of the selected sample display layout is larger than the number of pieces of content to be output, the sample display layout can be automatically changed such that the sample display layout is divided into as many output regions as the number of pieces of content to be output. For example, when two pieces of content are output while the number of content output regions of the selected sample display layout is 3 in FIGS. 10a, 10b and 10c, the sample display layout can be changed such that the sample display layout is divided into two regions respectively outputting the TX3 content 1060 and TX1 content 1070.

Alternatively, when the number of content output regions of the selected sample display layout is larger than the number of pieces of content to be output, predetermined content, for example, a predetermined advertisement image or video may be assigned to the remaining content output region.

For example, two pieces of content are output while the number of content output regions of the selected sample display layout is 3 in FIGS. 10a, 10b and 10c. In this case, a predetermined image can be assigned to the third region 1023. FIG. 10d illustrates a case in which an advertisement image 1078 is displayed in the remaining output region of the display layout.

RX2 may automatically change the display direction to the horizontal direction and display the content in the horizontal direction irrespective of whether TX3 and TX1 display the content in the horizontal or vertical direction.

When the received display layout information includes a thumbnail image or video data, or the thumbnail image or video data is separately received, TX1 may provide information to the user more intuitively by displaying the thumbnail image or a moving image corresponding to the video data when determining a display layout.

FIGS. 11a to 11d illustrate an example in which the menu screen includes a thumbnail image.

Referring to FIGS. 11a to 11d, the menu screen may include a plurality of sample display layouts 1120 and 1130 and menu items such as 'delete' 1141 and 'complete' 1142.

The menu screen may further include information 1110 about supported display layouts.

FIGS. 11*a*, 11*b* and 11*c* illustrate a case in which each of the sample display layouts 1120 and 1130 is divided into three output regions 1121, 1122 and 1123 (1131, 1132 and 1133) having a uniform area in the vertical or horizontal direction, as in FIGS. 10*a*, 10*b* and 10*c*.

Referring to FIG. 11*a*, a video or thumbnail image of TX content, which is being output by RX2, may be pre-assigned to predetermined regions 1121 and 1131 of the sample display layouts 1120 and 1130 automatically or according to user selection.

Upon selection of input for selecting one of the sample display layouts 1120 and 1130, output positions of a plurality of pieces of content, that is, TX1 content and TX3 content may be automatically determined on the basis of the selected sample display layout 1120, or additional setting input of the user may be received.

For example, referring to FIGS. 11*b* and 11*c*, the user can select output of the TX3 content through the first region 1121 and output of the TX1 content through the second region 1122.

In this case, the TX1 content can be displayed as a video or thumbnail image in the second region 1122.

Referring to FIG. 11*d*, the TX3 content 1160 and the TX1 content 1170 can be displayed according to the display layout selected in FIG. 11*c*.

When the number of content output regions of the selected sample display layout is larger than the number of pieces of content to be output, the sample display layout can be automatically changed such that the sample display layout is divided into as many output regions as the number of pieces of content to be output.

For example, when two pieces of content are output while the number of content output regions of the selected sample display layout is 3 in FIGS. 11*a*, 11*b* and 11*c*, TX1 can automatically change the selected sample display layout to a display layout having two output regions and transmit information on the changed display layout to RX2.

Referring to FIG. 11*d*, RX2 can display the TX3 content and the TX1 content in the two output regions 1160 and 1170.

Alternatively, the number of output windows that can be included in a display layout may be directly designated by the user instead of being initially set or determined according to preset 'deviceNum'.

For example, the menu screen can include items for selecting output regions, such as '2' 1120, '3' 1230 and '4' 1240, as shown in FIG. 12.

The menu screen may further include information 1210 about electronic devices which are currently in the content sharing mode. FIG. 12 illustrates an example in which TX1 is to transmit content to RX1 that is outputting TX3 content.

The information 1210 about electronic devices that are currently in the content sharing mode may be displayed as graphical objects indicating the electronic devices such that the information can be provided more intuitively.

FIGS. 13*a* and 13*b* illustrate another embodiment of determining a display layout.

When RX2 outputs two pieces of content, a menu screen as shown in FIG. 13*a* may be displayed. According to an embodiment, the menu screen as shown in FIG. 13*a* may be displayed when the user determines the number of output windows as '2' 1220 in FIG. 12.

Referring to FIG. 13*a*, the menu screen may include sample display layouts 1320 and 1330 each having two output regions 1321 and 1322, and 1331 and 1332 and further include information 1310 about electronic devices currently in the content sharing mode.

The video or thumbnail image of the TX3 content, which is output by RX2, may be pre-assigned to the first regions 1321 and 1331 of the sample display layouts 1320 and 1330 automatically or according to user selection.

When the user selects the right sample display layout 1330, the selected sample display layout 1330 may be magnified and displayed, as shown in FIG. 13*b*. The video or thumbnail image of the TX3 content may be displayed in the magnified first region 1351.

In this case, the selected sample display layout 1330 may be magnified to full screen and displayed. Display of the unselected sample display layout 1320 may be terminated.

The user may assign the TX1 content to the remaining second region 1352 of the display layout by selecting the second region 1352.

FIGS. 14*a* and 14*b* illustrate another embodiment of determining a display layout.

When the user determines the number of output windows as '3' 1230 in FIG. 12, for example, a menu screen as shown in FIG. 14*a* can be displayed.

Referring to FIG. 14*a*, the menu screen may include sample display layouts 1420 each having three output regions and further include information 1410 about electronic devices currently in the content sharing mode. In addition, the menu screen may further include a menu 1430 through which the user can view more sample display layouts which are not displayed.

When the user selects one of the sample display layouts 1420, the selected sample display layout 1440 may be displayed and display of unselected sample display layouts 1420 may be terminated, as shown in FIG. 14*b*.

The video or thumbnail image of the TX3 content, which is output by RX2, may be pre-assigned to a predetermined region 1441 from among output regions 1441, 1442 and 1443 of the selected sample display layout 1440 automatically or according to user selection.

The video or thumbnail image of the TX3 content may be displayed in the predetermined region 1441 and a video or thumbnail image 1450 of the TX1 content to be assigned to the display layout may be displayed in a portion of the menu screen. According to an embodiment, the menu screen may further display a predetermined video or image 1460. The video or image 1460 may be recommended content, advertisement content and the like and may be dragged and assigned to the display layout when the user wants to output the video or image 1460.

The user may drag and assign the TX1 content 1450 to a predetermined region 1442 of the display layout.

Referring to FIG. 14*d*, RX2 may output a plurality of pieces of content 1470, 1480 and 1490 according to the display layout determined by TX1. FIG. 14*d* illustrates a case in which the user additionally arranges the predetermined video or image 1460, displayed on the menu screen, in the display layout.

RX2 may enter a content sharing mode in which RX2 shares content with a notebook computer TX2 illustrated in FIG. 15.

Then, RX2 and TX2 can perform the aforementioned process and RX2 or TX2 can determine a display layout.

FIG. 16 illustrates a display screen of RX2 that receives content 1610, 1620 and 1630 from TX3, TX1 and TX2 and outputs the content 1610, 1620 and 1630.

TX1 in the content sharing mode in which TX1 shares content with RX2 may enter a content sharing mode in which TX1 shares content with another electronic device.

Referring to FIG. 17, RX1 may enter a content sharing mode in which RX1 shares content with TX4 (S1710), outputs TX4 content received from TX4 (S1715), enters a content sharing mode in which RX1 shares content with TX5 (S1720) and output TX5 content received from TX5 (S1725).

RX1 may negotiate the authority to determine a display layout with TX5 and output content according to the determined display layout.

FIG. 18 illustrates content display screens of TX4 and TX5 and FIG. 19 illustrates a content display screen of RX1, on which TX4 content 1910 is displayed at the left and TX5 content 1920 is displayed at the right according to the determined display layout.

TX1 may enter a content sharing mode in which TX1 shares content with RX1 that is being connected to TX5 and outputting content (S1740).

TX1 and RX1 in the content sharing mode may determine the authority to decide a display layout (S1750).

TX1 and RX1 may determine an electronic device having the authority to decide the display layout on the basis of predetermined priority of electronic devices according to the display layout policy or determine that an electronic device corresponding to manual input of the user has the authority to decide the display layout when the manual input of the user is applied.

FIG. 17 illustrates a case in which TX1 has the authority to determine the display layout.

RX1 may transmit, to TX1, display layout information necessary for TX1 to determine the display layout since TX1 has the authority to determine the display layout (S1760).

Here, the display layout information may include at least one of information on the number of electronic devices which are currently in a content sharing state, information on display layouts that can be supported, an output size of content received from another electronic device and currently displayed, and a thumbnail image of the content received from the other electronic device and currently displayed.

TX1 may display a menu screen through which a display layout of content output from RX1 can be determined (S1770) and receive input for selecting a display layout from the user (S1780).

FIGS. 20 to 24 illustrate an exemplary menu screen and an example in which the user directly determines a display layout. While FIGS. 20 to 24 illustrate a case in which TX1 determines a display layout when 'deviceNum' is 2, the present invention is not limited thereto.

Referring to FIG. 20, the menu screen may include a plurality of sample display layouts 2020 and 2030 and menu items such as 'delete' 2041 and 'complete' 2042.

The menu screen may further include information 2010 about supported display layouts. While the information 2010 about supported display layouts indicates that the corresponding device is connected to three devices and can simultaneously provide three output screens in FIGS. 20 to 24, information indicating provision of a content display screen divided into two content output regions since 'deviceNum' is 2 may be displayed according to an embodiment.

Although the content display screen divided into two content output regions is provided when 'deviceNum' is 2, RX1 is connected to TX4 and TX5 and outputs two pieces of content.

Accordingly, content that will not be output needs to be selected from content of TX4, TX5 and TX1. The user may select output of all content of TX4, TX5 and TX1 by changing 'deviceNum' to 3.

The sample display layouts 2020 and 2030 arrange current output content in a different format, and the user may select one of the sample display layouts 2020 and 2030 (S1780). Further, the user may set a display layout other than the sample display layouts 2020 and 2030.

FIG. 21 illustrates a case in which the user selects the display layout 2020 and a first region 2021 through which TX4 content has been output so as to set output of TX1 content through the first region 2021.

When the user selects 'complete' 2042 in this state, RX1 displays the TX1 content in the region which has output the TX4 content.

When the user wants to view the TX4 content more than TX5 content, the user may select the second region 2022 and 'delete' 2041, as shown in FIGS. 22 and 23, to cancel output of the TX5 content and set the second region 2022 as a TX4 content output position.

Then, the user may complete display layout determination by selecting 'complete' 2042, as shown in FIG. 24.

When the display layout is determined in this manner, TX1 may transmit display layout determination information including output positions of the shared content (TX1 content and TX4 content) to TX1 (S1780) and send video data, audio data and the like necessary to output the TX1 content to RX1 (S1790).

Referring to FIG. 25, RX1 may output the content in a layout in which the TX1 content 2510 is displayed at the left and the TX4 content 2520 is displayed at the right according to the determined display layout.

The present invention can provide an optimized display layout through negotiation and situation judgment rather than just exchanging content when electronic devices share a content display screen and enable a user to conveniently use various display layouts even in 1:N, N:1 and N:N content sharing environments.

The electronic device such as a mobile terminal and an image display device and the method for operating the same according to the foregoing embodiments is not restricted to the embodiments set forth herein. Therefore, variations and combinations of the exemplary embodiments set forth herein may fall within the scope of the present invention.

The method for operating an electronic device according to the foregoing embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disk, optical data storage, and a carrier wave, e.g., data transmission over the Internet. The computer-readable recording medium may be distributed over a plurality of computer systems connected to a network so that computer-readable code is written thereto and executed therefrom in a decentralized manner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for operating an electronic apparatus capable of sharing content with a plurality of electronic devices and outputting content, the method comprising:

entering, at the electronic apparatus, a content sharing mode capable of sharing content with a first electronic device;

outputting, on the electronic apparatus, first content shared with the first electronic device;

entering, at the electronic apparatus, a content sharing mode capable of sharing content with a second electronic device;

determining, at the electronic apparatus, whether the second electronic device has an authority to decide a display layout;

transmitting display layout information to the second electronic device upon determining that the second electronic device has the authority to decide the display layout; and receiving, from the second electronic device, display layout determination information including information on output positions of content shared with the first electronic device and content shared with the second electronic device, wherein the output positions correspond to display areas on a display of the electronic apparatus.

2. The method of claim 1, further comprising:
receiving data necessary to output second content, from the second electronic device; and
respectively outputting the first content and the second content to positions corresponding to the received information on content output positions.

3. The method of claim 1, further comprising:
displaying a menu screen through which a display layout of the content shared with the first and second electronic devices is determined upon determining that the second electronic device does not have the authority to decide the display layout; and
receiving user input for determining the display layout of the content shared with the first and second electronic devices.

4. The method of claim 3, further comprising:
receiving data necessary to output the second content, from the second electronic device; and
outputting the first content and the second content based on the determined display layout.

5. The method of claim 3, wherein the menu screen includes a plurality of sample display layouts.

6. The method of claim 5, further comprising receiving input for selecting one of the plurality of sample display layouts,
wherein content output positions are automatically determined according to the selected sample display layout.

7. The method of claim 6, further comprising assigning predetermined content to a remaining output region of the selected sample display layout when a total number of content output regions of the selected sample display layout is larger than a total number of pieces of content to be output.

8. The method of claim 5, further comprising:
receiving input for selecting one of the plurality of sample display layouts; and
receiving input for designating content output positions in the selected sample display layout.

9. The method of claim 8, further comprising assigning predetermined content to a remaining content output region of the selected sample display layout when a total number of content output regions of the selected sample display layout is larger than a total number of pieces of content to be output.

10. The method of claim 1, wherein, in the transmitting of the display layout information to the second electronic device, the transmitted display layout information includes at least one of information on a number of electronic devices currently in a content sharing state, information on supportable display layouts, information on an output size of the first content and a thumbnail image of the first content.

11. The method of claim 1, wherein the determining whether the second electronic device has the authority to decide the display layout comprises determining an electronic device having the authority to decide the display layout according to predetermined priority of electronic devices.

12. The method of claim 1, wherein the determining whether the second electronic device has the authority to decide the display layout comprises determining that an electronic device corresponding to manual input of a user has the authority to decide the display layout when the manual input of the user is present.

13. A method for operating an electronic apparatus capable of sharing content with a plurality of electronic devices and outputting content, the method comprising:
entering, at the electronic apparatus, a content sharing mode for sharing content with a second electronic device outputting first content shared with a first electronic device;
determining, at the electronic apparatus, whether the second electronic device has an authority to decide a display layout;
receiving, at the electronic apparatus, display layout information from the second electronic device upon determining that the second electronic device does not have the authority to decide the display layout;
displaying, at the electronic apparatus, a menu screen through which a display layout of the second electronic device is determined;
receiving user input for determining the display layout of the second electronic device; and
transmitting, to the second electronic device, display layout information including information on an output position of content of the second electronic device.

14. The method of claim 13, further comprising transmitting data necessary to output second content to the second electronic device.

15. The method of claim 13, wherein the menu screen includes a plurality of sample display layouts.

16. The method of claim 15, further comprising receiving input for selecting one of the plurality of sample display layouts,
wherein content output positions are automatically determined according to the selected sample display layout.

17. The method of claim 15, further comprising:
receiving input for selecting one of the plurality of sample display layouts; and
receiving input for designating content output positions in the selected sample display layout.

18. The method of claim 13, wherein, in the receiving of the display layout information from the second electronic device, the received display layout information includes at least one of information on a total number of electronic devices currently in a content sharing state, information on supportable display layouts, information on an output size of the first content and a thumbnail image of the first content.

19. The method of claim 13, wherein the determining whether the second electronic device has the authority to decide the display layout comprises determining an electronic device having the authority to decide the display layout according to predetermined priority of electronic devices.

20. The method of claim 13, wherein the determining whether the second electronic device has the authority to decide the display layout comprises determining that an electronic device corresponding to manual input of a user has the authority to decide the display layout when the manual input of the user is present.

* * * * *